(12) United States Patent
Wada

(10) Patent No.: US 9,075,589 B2
(45) Date of Patent: Jul. 7, 2015

(54) MANAGEMENT SYSTEM, APPARATUS, AND METHOD FOR SETTING POWER CONSUMPTION OF AN IMAGE FORMING APPARATUS

(71) Applicant: CANON KABUSHIKI KAISHA, Tokyo (JP)

(72) Inventor: Katsuhiro Wada, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 287 days.

(21) Appl. No.: 13/679,751

(22) Filed: Nov. 16, 2012

(65) Prior Publication Data
US 2013/0145183 A1    Jun. 6, 2013

(30) Foreign Application Priority Data

Dec. 5, 2011    (JP) .................................. 2011-266277

(51) Int. Cl.
| G06F 1/00 | (2006.01) |
| G06K 15/00 | (2006.01) |
| G06F 1/26 | (2006.01) |

(Continued)

(52) U.S. Cl.
CPC .............. *G06F 1/26* (2013.01); *G06F 1/3206* (2013.01); *G06F 1/3284* (2013.01); *G06F 1/3287* (2013.01); *Y02B 60/1267* (2013.01); *H04N 1/00244* (2013.01); *H04N 1/00344* (2013.01); *H04N 1/00899* (2013.01); *H04N 2201/0039* (2013.01); *H04N 2201/0094* (2013.01);

(Continued)

(58) Field of Classification Search
CPC ...................................................... G06F 1/3203
USPC ......................................................... 713/300
See application file for complete search history.

(56) References Cited

U.S. PATENT DOCUMENTS

| 8,374,515 | B2 * | 2/2013 | Shioyasu et al. .................. 399/8 |
| 8,594,520 | B2 * | 11/2013 | Kohri et al. ...................... 399/31 |

(Continued)

FOREIGN PATENT DOCUMENTS

| JP | 2005-53122 A | 3/2005 |
| JP | 2011-36084 A | 2/2011 |

OTHER PUBLICATIONS

Piette, Mary Ann, et al., Demand Response Research Center, "Open Automated Demand Response Communications Specification (Version 1.0)", Apr. 2009, available at http://openadr.lbl.gov/pdf/cec-500-2009-063.pdf (last visited Aug. 25, 2011].

*Primary Examiner* — Suresh Suryawanshi
(74) *Attorney, Agent, or Firm* — Fitzpatrick, Cella, Harper & Scinto

(57) ABSTRACT

A management system which includes an image forming apparatus having a plurality of functions, and a management apparatus which manages the image forming apparatus, the management apparatus comprises: a power consumption acquisition unit which acquires information of power consumptions for the respective functions of the image forming apparatus; a supply power acquisition unit which acquires information of a supply power to be supplied to the image forming apparatus; a determination unit which determines a power consumption value to be consumed by the image forming apparatus based on the information of the power consumptions for the acquired respective functions and the information of the acquired supply power; and a setting unit which sets a power consumption of the image forming apparatus to be operated at the determined power consumption value.

13 Claims, 14 Drawing Sheets

(51) Int. Cl.
*G06F 1/32* (2006.01)
*H04N 1/00* (2006.01)
*G06Q 10/10* (2012.01)
*G06Q 50/06* (2012.01)

(52) U.S. Cl.
CPC ........... *Y02B60/1282* (2013.01); *G06Q 10/101* (2013.01); *G06Q 50/06* (2013.01)

(56) References Cited

U.S. PATENT DOCUMENTS

| | | | |
|---|---|---|---|
| 8,724,132 B2* | 5/2014 | Nozawa | 358/1.14 |
| 8,842,308 B2* | 9/2014 | Nozawa | 358/1.14 |
| 8,868,953 B2* | 10/2014 | Kim et al. | 713/324 |
| 2005/0030582 A1 | 2/2005 | Xu | |
| 2011/0035075 A1 | 2/2011 | Tomita et al. | |

* cited by examiner

FIG. 9

| DEVICE IDENTIFIER | ADDRESS | FUNCTION | STATUS | POWER CONSUMPTION |
|---|---|---|---|---|
| Model300 : SN123 | 192.168.0.1 | Color Print | PRINT AT 60 ppm | 0.83W / page |
| Model300 : SN123 | 192.168.0.1 | Color Print | STANDBY | 0.003W / page |
| Model300 : SN123 | 192.168.0.1 | Storage | ACCESS | 5.5Wh |
| Model500 : SN001 | 192.168.0.2 | B/W Print | PRINT AT 50 ppm | 0.50W / page |
| Model500 : SN001 | 192.168.0.2 | B/W Print | PRINT AT 10 ppm | 0.15W / page |

| | MFP A | MFP B | MFP C |
|---|---|---|---|
| AVERAGE POWER CONSUMPTION | 65.99W | 23.00W | 40.25W |
| POWER CONSUMPTION PER MONTH | 47.5KW | 16.5KW | 9.6KW |
| POWER EFFICIENCY (PRINT) | 1.8W / page | 2.5W / page | 7W / page |
| POWER EFFICIENCY (FAX) | 1KW / page | 13W / page | 1KW / page |
| PRINT MODE POWER CONSUMPTION (MAX) | 1250W | 820W | 1000W |
| SLEEP MODE POWER CONSUMPTION | 5.1W | 0.9W | 3.8W |
| FAX STANDBY POWER CONSUMPTION | 5W | 5W | 5W |
| PRINTED PAGE COUNT | 25677 PAGES | 623 PAGES | 123 PAGES |
| OPERATING TIME | 720h | 720h | 240h |
| FAX TRANSMITTED PAGE COUNT | 4 PAGES | 267 PAGES | 0 PAGES |
| USE EFFICIENCY | 0.37 | 20 | 7.4 |
| USER COUNT | 86 USERS | 25 USERS | 4 USERS |
| COLOR PRINT SPEED | 60ppm | 20ppm | 30ppm |
| B/W PRINT SPEED | 60ppm | 40ppm | 30ppm |

F I G. 11A

| 1101 | 1102 | 1103 | 1104 |
|---|---|---|---|
| ORDER | 1 | 2 | 3 |
| POWER EFFICIENCY (FAX) | MFP B(13W / page) | MFP A(1KW / page) | MFP C(1KW / page) |
| FAX STANDBY POWER CONSUMPTION | 5W | 5W | 5W |

F I G. 11B

| 1105 | 1106 | 1107 | 1108 |
|---|---|---|---|
| ORDER | 1 | 2 | 3 |
| PRINTED PAGE COUNT | MFP A(25677 PAGES) | MFP B(623 PAGES) | MFP C(123 PAGES) |

FIG. 14

| | WEB SERVICE IDENTIFIER (1401) | SERVICE (1402) | UNIT POWER CONSUMPTION (1403) | POWER UNIT PRICE (1404) | POWER SOURCE (1405) |
|---|---|---|---|---|---|
| 1 | 1000-1000-0001 | HARD DISK | 10W / TB | 45 YEN / KWh | GREEN POWER |
| 2 | 1000-1000-0002 | HARD DISK | 10W / TB | 22 YEN / KWh | GENERAL POWER |
| 3 | 1000-1000-0100 | IMAGE PROCESSING BOARD | 10W / 1ppm | 45 YEN / KWh | GREEN POWER |
| 4 | 1000-1000-0102 | FAX BOARD | 6W / page | 22 YEN / KWh | GENERAL POWER |

MANAGEMENT SYSTEM, APPARATUS, AND METHOD FOR SETTING POWER CONSUMPTION OF AN IMAGE FORMING APPARATUS

BACKGROUND OF THE INVENTION

1. Field of the Invention

The present invention relates to a management system, management apparatus, management method, and computer-readable medium, which manage the operating statuses of image forming apparatuses.

2. Description of the Related Art

Conventionally, as stable and efficient power supply methods, non-green powers by means of thermal power generation, nuclear power generation, and the like have been used. In recent years, use of green powers generated by wind generation, photovoltaic generation, biomass power generation, micro hydro, geothermal generation, and the like, which have lighter environmental loads, is increasing. However, as a feature of the green power, since a supply power amount depends on the weather, climate, and time, it is difficult to stably supply a power.

For this reason, in order to control power supply and demand, a project for laying power grids which can control and optimize the electric power flow based on smart grids (next-generation power grids) from both the supply and demand sides has been advanced. For example, Demand Response Research Center, "OPEN AUTOMATED DEMAND RESPONSE COMMUNICATIONS SPECIFICATION (Version 1.0)", [online], April 2009, [search on Aug. 25, 2011], Internet <URL:http://openadr.lbl.gov/pdf/cec-500-2009-063.pdf> specifies standard communication specifications required to exchange demand response signals between a power company which supplies electrical power and consumers on the power demand side.

Also, Japanese Patent Laid-Open No. 2011-36084 discloses a technique for controlling electric power to minimize the influences on convenience and comfort of consumers at the time of occurrence of a demand response signal of the power company. According to this literature, a system which can minimize the influences on the convenience and comfort of consumers by precisely executing power control based on the current status and previous performance data as a power suppression method based on a demand response signal is provided. Furthermore, Japanese Patent Laid-Open No. 2005-53122 discloses a system which reduces the environmental loads and also reduces the workloads on users at the time of use of an MFP (Multi-Function Peripheral) system.

However, the communication specifications described in Demand Response Research Center, "OPEN AUTOMATED DEMAND RESPONSE COMMUNICATIONS SPECIFICATION (Version 1.0)", [online], April 2009, [search on Aug. 25, 2011], Internet <URL:http://openadr.lbl.gov/pdf/cec-500-2009-063.pdf> do not include any power control method of multi-function apparatuses such as image forming apparatus and MFPs and an apparatus configured by a plurality of hardware components and software services as power control target apparatuses of consumers. For this reason, it is difficult to flexibly attain power suppression based on a demand response signal for respective functions. In order to effectively attain power suppression based on a demand response signal, the whole apparatus or respective principal functions are stopped, thus considerably impairing the user convenience.

In Japanese Patent Laid-Open No. 2011-36084, power control of a single function of an apparatus is executed. For this reason, it is difficult to execute the power control of multi-function apparatuses so as not to impair the convenience as much as possible according to the usage situations of the respective functions and apparatuses of the users. For example, it is impossible to execute power control by prioritizing functions and apparatuses which are frequently used by the users. Furthermore, when apparatuses are operated using electric power such as green power whose supply power amount largely depends on the weather, climate, and time, and which is difficult to be stably supplied, the apparatuses cannot be stably operated. For example, drastic power suppression based on a demand response signal is required, and the entire apparatus or many functions are stopped, thus considerably impairing the user convenience.

Japanese Patent Laid-Open No. 2005-53122 does not provide any mechanism which suppresses functions and power consumption according to a supply power when the supply power fluctuates. Also, it is impossible to implement control which continues processing as a system while attaining power suppression by processing functions of the MFP using an information processing apparatus having a different supply power.

SUMMARY OF THE INVENTION

According to one aspect of the present invention, there is provided a management system which includes an image forming apparatus having a plurality of functions, and a management apparatus which manages the image forming apparatus, the management apparatus comprising: a power consumption acquisition unit configured to acquire information of power consumptions for the respective functions of the image forming apparatus; a supply power acquisition unit configured to acquire information of a supply power to be supplied to the image forming apparatus; a power consumption determination unit configured to determine a power consumption value to be consumed by the image forming apparatus based on the information of the power consumptions for the respective functions acquired by the power consumption acquisition unit and the information of the supply power acquired by the supply power acquisition unit; and a power consumption setting unit configured to set a power consumption of the image forming apparatus to be operated at the power consumption value determined by the power consumption determination unit.

According to another aspect of the present invention, there is provided a management apparatus which manages an image forming apparatus having a plurality of functions, comprising: a power consumption acquisition unit configured to acquire information of power consumptions for the respective functions of the image forming apparatus; a supply power acquisition unit configured to acquire information of a supply power to be supplied to the image forming apparatus; a power consumption determination unit configured to determine a power consumption value to be consumed by the image forming apparatus based on the information of the power consumptions for the respective functions acquired by the power consumption acquisition unit and the information of the supply power acquired by the supply power acquisition unit; and a power consumption setting unit configured to set a power consumption of the image forming apparatus to be operated at the power consumption value determined by the power consumption determination unit.

According to another aspect of the present invention, there is provided a management method of an image forming apparatus having a plurality of functions, comprising: acquiring information of power consumptions for the respective functions of the image forming apparatus; acquiring information of a supply power to be supplied to the image forming apparatus; determining a power consumption value to be consumed by the image forming apparatus based on the acquired information of the power consumptions for the respective functions and the acquired information of the supply power acquired; and setting a power consumption of the image forming apparatus to be operated at the power consumption value determined in the determining step.

According to another aspect of the present invention, there is provided a non-transitory computer-readable medium storing a program for controlling a computer to function as: a power consumption acquisition unit configured to acquire information of power consumptions for respective functions of an image forming apparatus; a supply power acquisition unit configured to acquire information of a supply power to be supplied to the image forming apparatus; a power consumption determination unit configured to determine a power consumption value to be consumed by the image forming apparatus based on the information of the power consumptions for the respective functions acquired by the power consumption acquisition unit and the information of the supply power acquired by the supply power acquisition unit; and a power consumption setting unit configured to set a power consumption of the image forming apparatus to be operated at the power consumption value determined by the power consumption determination unit.

According to the present invention, a management system which continuously provides services while attaining efficient power management even in an apparatus configured by a plurality of functions as a power control target apparatus can be provided.

Further features of the present invention will become apparent from the following description of exemplary embodiments (with reference to the attached drawings).

BRIEF DESCRIPTION OF THE DRAWINGS

FIG. 9 is a table showing an example of the configuration of a device management DB;

FIG. 10 is a table showing an example of the configuration of a power consumption analysis result log according to the second embodiment;

FIGS. 11A and 11B are tables showing examples of the configurations of priority function lists according to the second embodiment;

FIG. 14 is a table showing an example of the configuration of a list database according to the third embodiment.

DESCRIPTION OF THE EMBODIMENTS

First Embodiment

[System Configuration]

Figure 1:
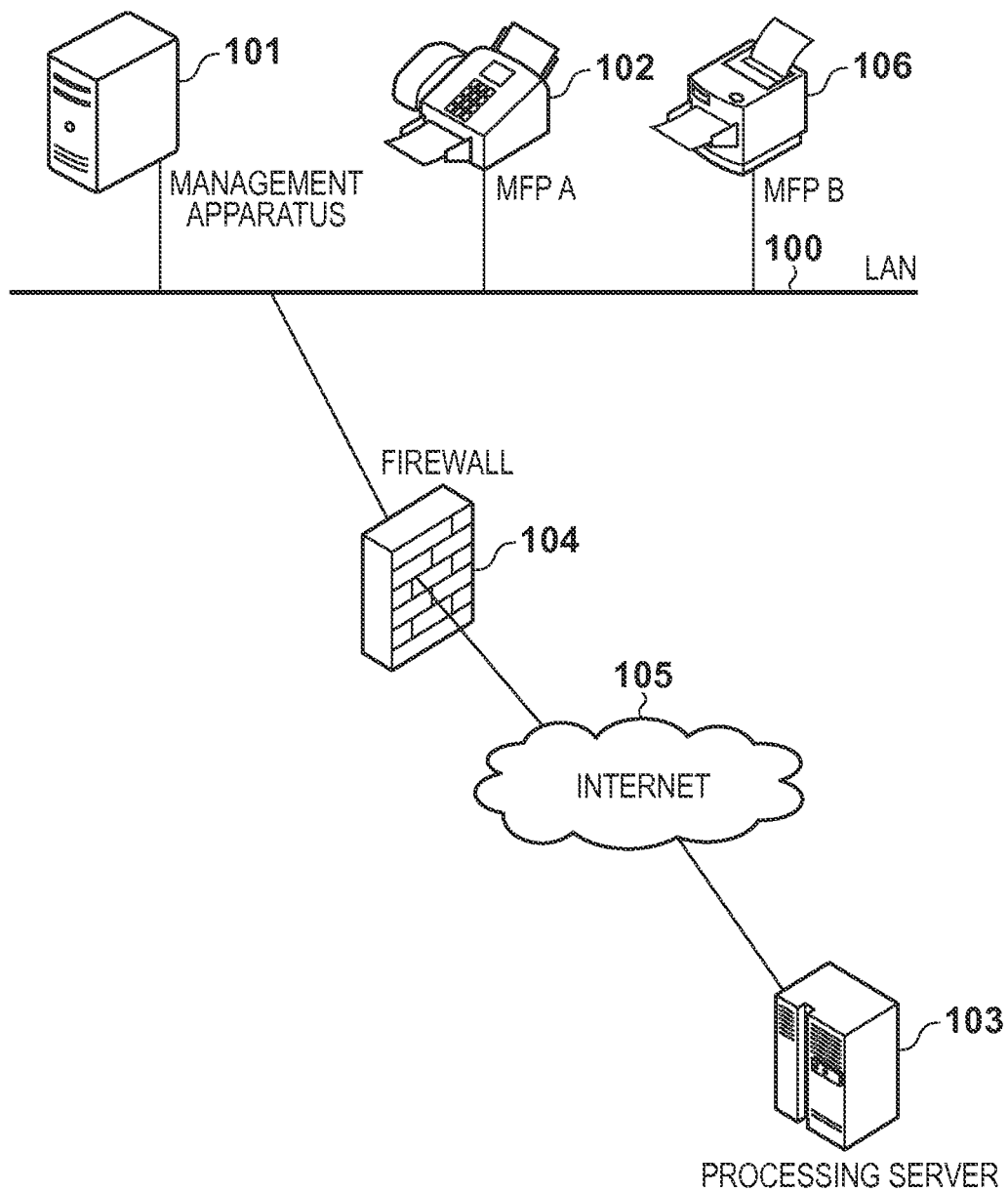
FIG. 1 is a view showing an example of the system configuration.

A mode for carrying out the present invention will be described hereinafter with reference to the drawings. FIG. 1 is a view showing an example of the system configuration used to explain a use environment of an image forming system according to an embodiment of the present invention. Note that operations of programs in a management apparatus 101, multi-function apparatus A 102, and processing server 103 may be executed using a CPU, RAM, and ROM on a printer or MFP as long as the functions of the present invention can be implemented. Also, operations of programs in the processing server 103 may be executed by a virtual computer environment.

In an image forming system according to this embodiment, a management apparatus 101 and multi-function apparatus A 102 are connected via a LAN 100. Furthermore, a processing server 103 is connected to the LAN 100 via a firewall 104 and Internet 105.

The management apparatus 101, multi-function apparatus A 102, and processing server 103 hold IP addresses required to communicate with other communication apparatuses on the LAN 100 and Internet 105.

The management apparatus 101 manages statuses and the like of an image forming apparatus (multi-function apparatus) according to this embodiment and executes power control. The multi-function apparatus A 102 provides services which respond to various requests as in a print server function (LPD: RFC1179) and the processing server 103. The services include, for example, server functions such as a Web service, file service, SNMP (Simple Network Management Protocol), and WS-Eventing.

The processing server 103 provides services which respond to requests from the multi-function apparatus A 102 as a request source. The services provided by the processing server 103 include, for example, server functions such as a Web service, storage service, image processing service, and mail service. The processing server 103 may be configured to communicate with another server in response to a request from the request source. Furthermore, in the processing server 103, a virtual server and virtual disk may be configured by a plurality of physical servers and physical storages.

In this embodiment, a power source management request and printer information acquisition request from the management apparatus 101 are passed to the multi-function apparatus A 102 via the LAN 100, and processes according to the requests are executed by the multi-function apparatus A 102.

Note that when a failure has occurred in the multi-function apparatus A 102, the multi-function apparatus A 102 connects the processing server 103 via the Internet 105 as needed. Then, required processes are executed on the processing server 103 side in place of the multi-function apparatus A 102, thus normally processing a print request and printer information acquisition request.

Note that in the present invention, services provided by a server computer need only be communications using addresses, and do not limit protocols such as IPv4 and IPv6. A connection method between the management apparatus 101 and multi-function apparatus A 102 and between the multi-function apparatus A 102 and processing server 103 may adopt a network other than the LAN and Internet or another communication method such as a wireless LAN (for example, IEEE802.11). The present invention is applicable to a system with that arrangement.

In the present invention, these communication protocols do not limit protocols in respective layers, that is, a physical layer, data link layer, network layer, transport layer, session layer, presentation layer, and application layer of an OSI reference model. Furthermore, network devices, information processing apparatuses, communication apparatuses, and the like other than the apparatuses shown in this embodiment may be connected to the network.

[Arrangement of Apparatus]

(Host Computer)

Figure 2:
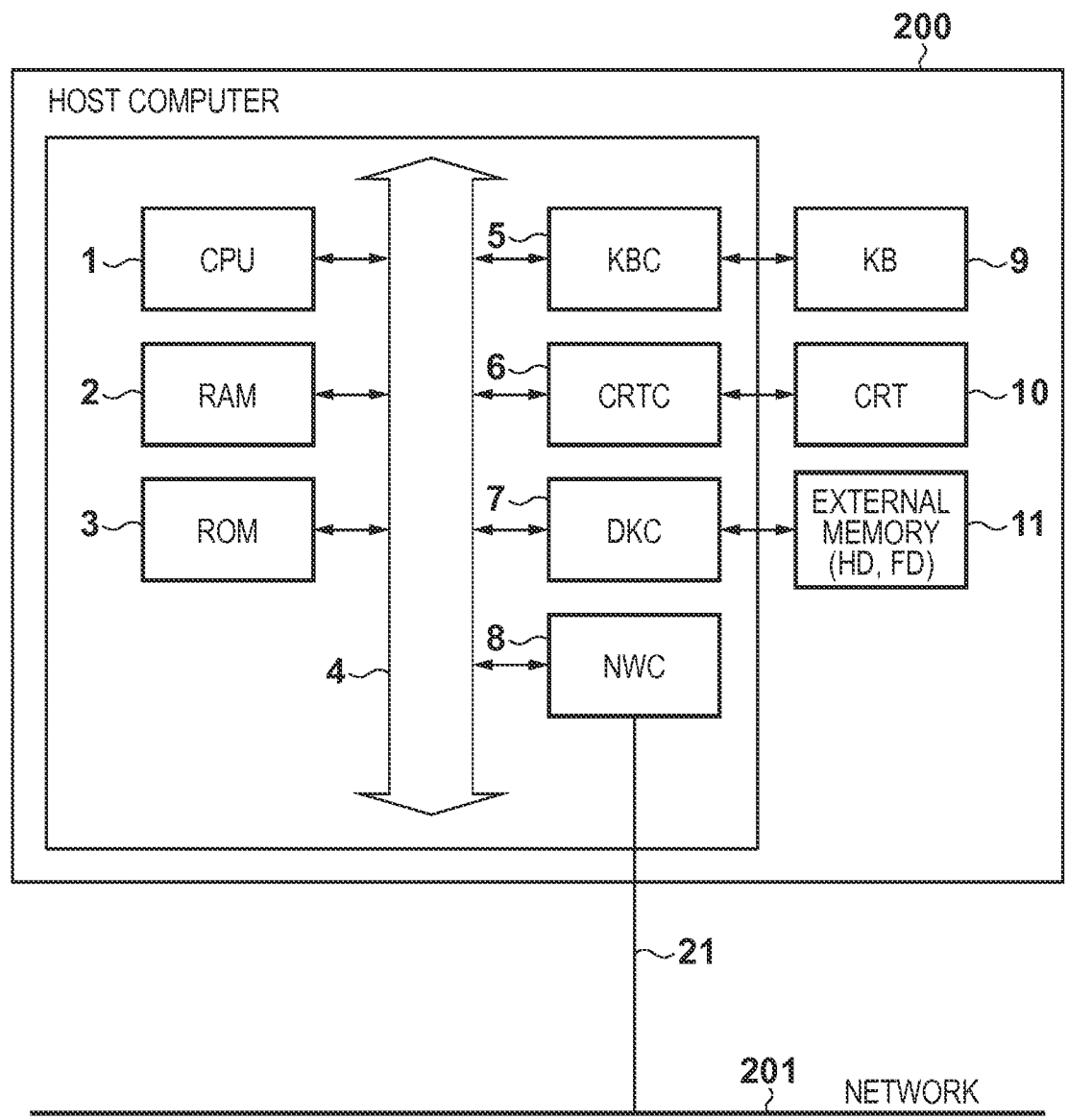
FIG. 2 is a block diagram showing an example of the hardware arrangement of a management apparatus and processing server.

FIG. 2 is a block diagram showing an example of the arrangement of a host computer as the management apparatus 101 and processing server 103 according to this embodiment.

In a host computer 200, a CPU 1 is a central processing unit which systematically controls respective devices connected to a system bus 4. The CPU 1 executes various kinds of processing such as document processing of documents including graphics, images, characters, tables (including spreadsheets, etc.), and the like based on applications (document processing program and the like) stored in a program ROM of a ROM 3 or an external memory (HD) 11. Also, the CPU 1 executes rasterize processing of outline fonts onto, for example, a display RAM assured on a RAM 2, and displays the rasterized fonts on a CRT (display unit) 10 via a CRTC (display controller) 6.

Furthermore, the CPU 1 opens various registered windows based on commands designated by a mouse cursor (not shown) or the like on this CRT 10, and executes various kinds of data processing. When the user uses a service provided by a client application or server, he or she can open a window associated with its setting operations, and can make settings. Note that the display unit is not limited to the CRT, and a liquid crystal or plasma display may be used.

The RAM 2 functions as a main memory, work area, and the like of the CPU 1. The ROM 3 includes a font ROM (not shown), program ROM (not shown), data ROM (not shown), and the like as components. The font ROM or external memory 11 stores font data and the like used in the document processing or the like. The program ROM or external memory 11 stores an OS (Operating System) and the like as a control program of the CPU 1. The data ROM or external memory 11 stores various data used upon execution of the aforementioned document processing or the like. A program stored in the external memory 11 is expanded onto the RAM 2 when it is executed, and is executed by the CPU 1.

A KBC (keyboard controller) 5 controls input information from a KB (keyboard) 9 and pointing device (not shown). The CRTC 6 controls inputs/outputs with respect to a display operation on the CRT 10. A DKC (disk controller) 7 controls accesses to the external memory 11. A NWC (network controller) 8 is connected to a network 201 via a two-way interface 21. The network 201 corresponds to, for example, the LAN 100, Internet 105, and the like shown in FIG. 1.

The KB 9 includes various keys. The CRT 10 displays graphics, images, characters, tables, and the like. The external memory 11 includes a hard disk (HD), Floppy® disk, and the like. This external memory 11 stores a boot program, various applications, font data, user files, edit files, and the like.

(Multi-Function Apparatus)

Figure 3:
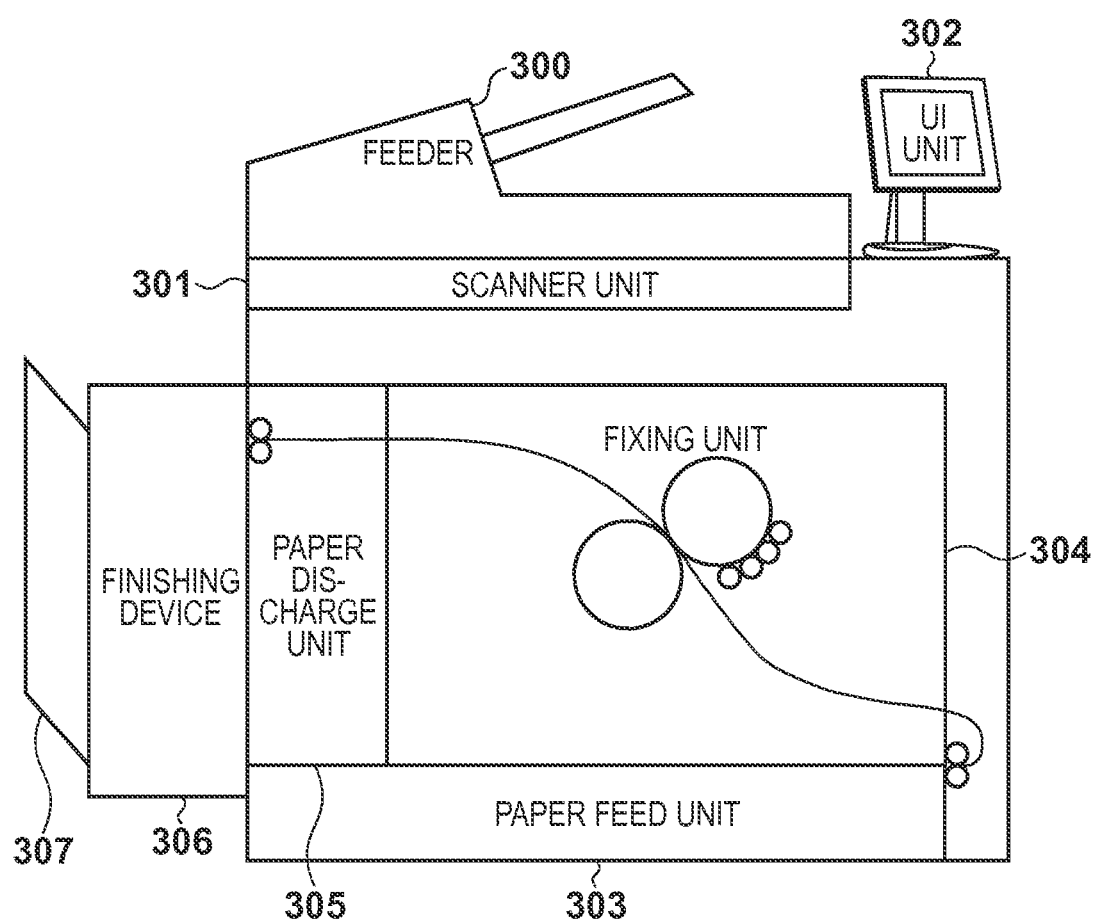
FIG. 3 is a view showing an example of the hardware arrangement of a multi-function apparatus.

FIG. 3 is a view showing an example of the arrangement of the multi-function apparatus A 102 shown in FIG. 1. Note that an MFP which provides multiple functions such as a printer which provides a print function, scanner, FAX, and the like or a printer which provides a single function is similarly applicable to the multi-function apparatus A 102 as the image forming apparatus in this embodiment. This embodiment shows an example of the arrangement of a general MFP.

A feeder 300 (automatic document feeder) is a mechanism which automatically feeds paper sheets to be scanned by a scanner unit 301. The scanner unit 301 of documents scans paper information to obtain digital data. A UI unit 302 is a mechanism which receives an operation input operation of the MFP and displays information. A paper feed unit 303 is a mechanism for feeding a paper sheet to be used in printing to a fixing unit 304. The fixing unit 304 is a mechanism for fixing toners on the paper sheet fed from the paper feed unit 303 to attain printing.

A paper discharge unit 305 is a mechanism for discharging the paper sheet printed by the fixing unit 304. A finishing device 306 is a mechanism for applying post-processes such as stapling and punching to paper sheets discharged from the paper discharge unit 305 according to post-processing settings. A discharge tray 307 holds final printed products which have undergone print and finishing processes.

(Printer Controller)

Figure 4:
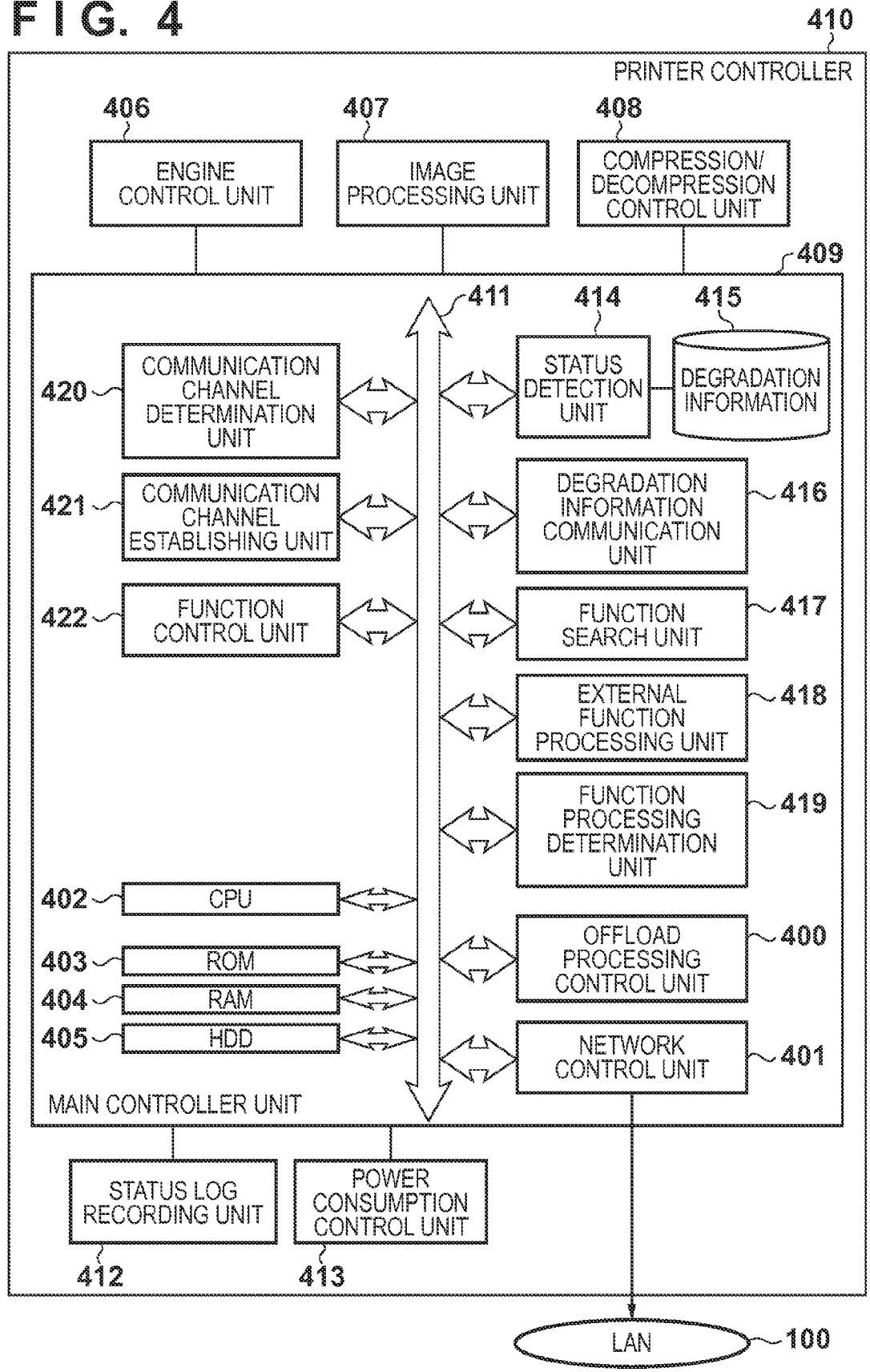
FIG. 4 is a block diagram showing an example of the arrangement of the multi-function apparatus.

FIG. 4 is a block diagram for explaining the arrangement of a printer controller 410 in the multi-function apparatus (to be referred to as an MFP hereinafter) A 102 according to this embodiment. The printer controller 410 includes various software and hardware components such as a main controller unit 409, engine control unit 406, image processing unit 407, compression/decompression processing unit 408, and the like, and controls the image forming apparatus (MFP).

The main controller unit 409 controls the overall print function. The main controller unit 409 executes input/output control with an external apparatus so as to issue an instruction to the engine control unit 406, image processing unit 407, and the like, thereby controlling the print function.

An offload processing control unit 400 executes control as a characteristic feature of the present invention. When the management apparatus 101 detects a drop of a supply power to the MFP A 102, the offload processing control unit 400 controls the processing server 103 of a difference power supply source to process a job for degraded functions of the MFP A 102 caused by the supply power drop. Thus, even when the supply power to the MFP A 102 drops, requested jobs are transferred to another apparatus, thus preventing function degradation of the whole system.

By transferring jobs (to be alternatively processed by another apparatus), since functions required to process these jobs in the MFP A 102 can be stopped, a power consumption of the MFP A 102 can never rise. That is, a low power consumption can be maintained in the MFP A 102. In this case, "function degradation" indicates that functions which can be provided by the MFP or respective apparatuses can no longer be provided (or they cease to be provided) for any reason (in this case, a supply power drop). Also, to continue operations while functions are degraded will be described as "degraded running" or "running on degradation mode". The offload processing control unit 400 is a main control unit which executes control when an external apparatus such as the processing server 103 alternatively processes functions provided by an MFP such as the MFP A 102.

In this embodiment, the offload processing control unit 400 runs on a CPU 402, ROM 403, RAM 404, HDD 405, and network control unit 401 on the main controller unit 409. Note that these components may be independently configured as dedicated offload control hardware components, and a system having higher availability can be constructed in this case. Furthermore, by arranging redundant offload control hardware components, a system with higher availability can be constructed, needless to say.

The network control unit 401 executes communication control with an external apparatus via the network such as the LAN 100. In this embodiment, the network control unit 401 receives a power source management request and printer information acquisition request from the management apparatus 101, and transmits their results. Also, the network control unit 401 exchanges data associated with processing to be alternatively executed by an external apparatus such as the processing server 103 upon occurrence of function degradation of the MFP A 102.

The CPU 402 is a central processing unit which controls respective devices connected to a controller bus 411. The CPU 402 executes various kinds of processing required to control the MFP A 102 based on programs stored in a program ROM of the ROM 403 or the HDD 405 as an external memory.

The ROM 403 functions as a storage area of programs and the like to be executed by the CPU 402. The RAM 404 functions as a main memory, work area, and the like of the CPU 402. The HDD 405 functions as storage area of programs, a work area, and user data.

The engine control unit 406 controls the print function in the MFP A 102. The engine control unit 406 controls, for example, conveyance of sheets and a fixing device as the control of the print function. The engine control unit 406 controls to feed a paper sheet conveyed from the paper feed unit 303 to the fixing unit 304, and to transfer rendering data processed by the image processing unit 407 on the paper sheet. The fixing unit 304 attains printing by fixing toners on the paper sheet fed from the paper feed unit 303. Furthermore, the paper sheet printed by the fixing unit 304 is conveyed to the paper discharge unit 305.

The image processing unit 407 executes rasterize processing of a rendering command (PDL: Page Description Language) to convert it into rendering data. The image processing unit 407 also executes various kinds of color processing and processing based on engine specific information.

The compression/decompression control unit 408 executes compression and decompression of rendering data and the like. Since rendering data takes time in communication processing if it is transferred in a non-compressed state, a transfer time can be shortened by transferring compressed data. However, upon execution of image processing such as color conversion processing of rendering data, after compressed data is decompressed to rendering data, the rendering data has to be expanded on the RAM 404 to execute the processing. For example, when large-capacity data is transferred via a low-speed communication channel in a hardware bus in a controller or a network such as a LAN or the Internet, it is indispensable to compress data so as to shorten a data transfer time.

The controller bus 411 is a communication bus inside the MFP A 102 such as the main controller unit 409, engine control unit 406, image processing unit 407, and compression/decompression unit 408. The controller bus 411 can also communicate with an external apparatus via the network control unit 401.

A status log recording unit 412 records information of statuses of various functions upon execution of jobs in the MFP A 102. The status log recording unit 412 stores information of jobs to be managed and status transition information as job log information at completion timings of jobs of various functions and status change timings. The job log information used in this case includes power consumption information upon execution of various jobs and status changes. Note that the power consumption information in this case includes, for example, a rated power consumption, maximum power consumption, standby power consumption, average power consumption, and the like with respect to functions of hardware/software components which configure the image forming apparatus. The status log recording unit 412 transmits job log information in response to a request from the management apparatus 101.

A power consumption control unit 413 monitors an input from a power source of the MFP A 102, and manages a power source status such as a normal mode, power saving mode (operation mode), and ON/OFF of the power source. In the power saving mode, a power consumption amount is smaller than that in the normal mode. Note that the power consumption control unit 413 may set a plurality of levels of the power saving mode, or may set power saving modes for respective modules of the MFP A 102. The power consumption control unit 413 can control to shift to respective power source statuses according to various conditions.

For example, when an operation has not been made for the MFP A 102 for a predetermined period of time, and none of a print job, FAX data, and an instruction from the network are received in the normal mode, the power consumption control unit 413 controls the MFP A 102 to shift to the power saving mode. When an arbitrary operation is made or any of a print job, FAX data, and an instruction from the network is received in the power saving mode, the power consumption control unit 413 controls the MFP A 102 to shift to the normal mode.

A status detection unit 414 detects a power status change of the MFP A 102, and specifies unavailable functions and components. Also, the status detection unit 414 detects a status change upon power source recovery, and specifies functions and components which are recovered to a normal status. A degradation information 415 is a storage unit which stores degradation information detected by the status detection unit 414. The degradation information will be described later.

A degradation information communication unit 416 communicates with a degradation information processing unit 610 of the processing server 103, and notifies it of error locations of the MFP A 102 based on the degradation information 415. Furthermore, the degradation information communication unit 416 inquires about services the processing server 103 can provide to the MFP A 102 based on the degradation information 415.

A function search unit 417 searches for the processing server 103 available for the MFP A 102 and services provided by that processing server 103 based on the degradation information 415. A function processing determination unit 419 determines whether a specific function is implemented by a function processing unit (firmware processing) inside the MFP A 102 or that (server processing) outside the MFP A 102. The specific function in this case indicates a function which is required when a requested job is to be processed.

An external function processing unit 418 executes communication control when processing of the MFP A 102 is implemented by a service of the processing server 103. That is, when the function processing determination unit 419 determines that processing is executed by the function processing unit outside the MFP A 102, the external function processing unit 418 executes the communication control. The function processing determination unit 419 determines whether or not functions degraded due to an insufficient supply power in the MFP A 102 can be processed by the processing server 103 as an external apparatus.

A communication channel determination unit 420 acquires communication specifications between the processing server 103 and MFP A 102. Furthermore, the communication channel determination unit 420 determines whether or not services the processing server 103 can provide to the MFP A 102 can be available between the processing server 103 and MFP A 102. The communication specifications "from the MFP A 102 to the processing server 103" and "from the processing server 103 to the MFP A 102" in terms of services include, for example: a communication band, band limitation, communication delay time, availability of two-way communications, two-way communication method, availability of event transmission, event transmission method, event transmission delay time, communication charge, communication authority, available protocols, available port numbers, and the like.

A communication channel establishing unit 421 establishes a communication channel between the processing server 103 and MFP A 102 required to use services the processing server 103 can provide to the MFP A 102 based on the determination result of the communication channel determination unit 420.

A function control unit 422 controls to switch a main body of processing for a requested job "from the MFP A 102 to the processing server 103" and "from the processing server 103 to the MFP A 102". For example, a case will be examined wherein error processing of the MFP A 102 is executed by the processing server 103 in an environment including the firewall 104. In this case, a service provided by the processing server 103 which is located outside the firewall 104 is used by the MFP A 102 located inside the firewall 104. At this time, in order to assure realtimeness, a communication unit which notifies an event as a one-way communication from the processing server 103 to the MFP A 102 located inside the firewall 104 has to be established. That is, the event has to establish a one-way session different from a processing request from the MFP A 102 to an apparatus located outside the firewall 104 for the MFP A 102 from a location outside the firewall 104.

The communication channel establishing unit 421 allows the processing server 103 located outside the firewall 104 to notify the MFP A 102 of the event required to assure realtimeness by, for example, the following method:

a method of allowing a process outside the firewall 104 to use a connection point outside the firewall 104 which holds a session;

a method of allowing a process outside the firewall 104 to hold a session by multipart/x-mixed-replace of HTML (Hyper-Text Markup Language); and a method of allowing a process inside the firewall 104 to poll an apparatus outside the firewall 104.

Furthermore, the communication channel establishing unit 421 allows an apparatus outside the firewall 104 to execute high-speed image processing so as to cope with the processing speed of the image processing apparatus. For this purpose, the communication channel establishing unit 421 makes broadband, high-speed communications to establish a plurality of independent session communication channels according to a network band required by a service. The communication channel establishing unit 421 establishes a plurality of sessions, which are different from a processing request from the MFP A 102 to the processing server 103, from the processing server 103 to the MFP A 102.

Even when the firewall 104 is located on a communication channel, the communication channel establishing unit 421 establishes a communication channel which allows the MFP A 102 to autonomously avoid errors. For example, the communication channel establishing unit 421 specifies locations degraded in the MFP A 102 due to an insufficient supply power using the degradation information processing unit 610 of the processing server 103 and the degradation information communication unit 416 of the MFP A 102. Then, the communication channel establishing unit 421 specifies functions which cannot provide services in the MFP A 102. At this time, the communication channel establishing unit 421 determines and establishes communication channels required for Web services to be provided by the processing server 103 using itself, a communication channel control unit 609 of the processing server 103, and the communication channel determination unit 420.

By dynamically executing these processes, services can be continuously provided by the system as a whole even upon occurrence of function degradation due to an insufficient supply power to the MFP A 102.

(Management Apparatus)

Figure 5:
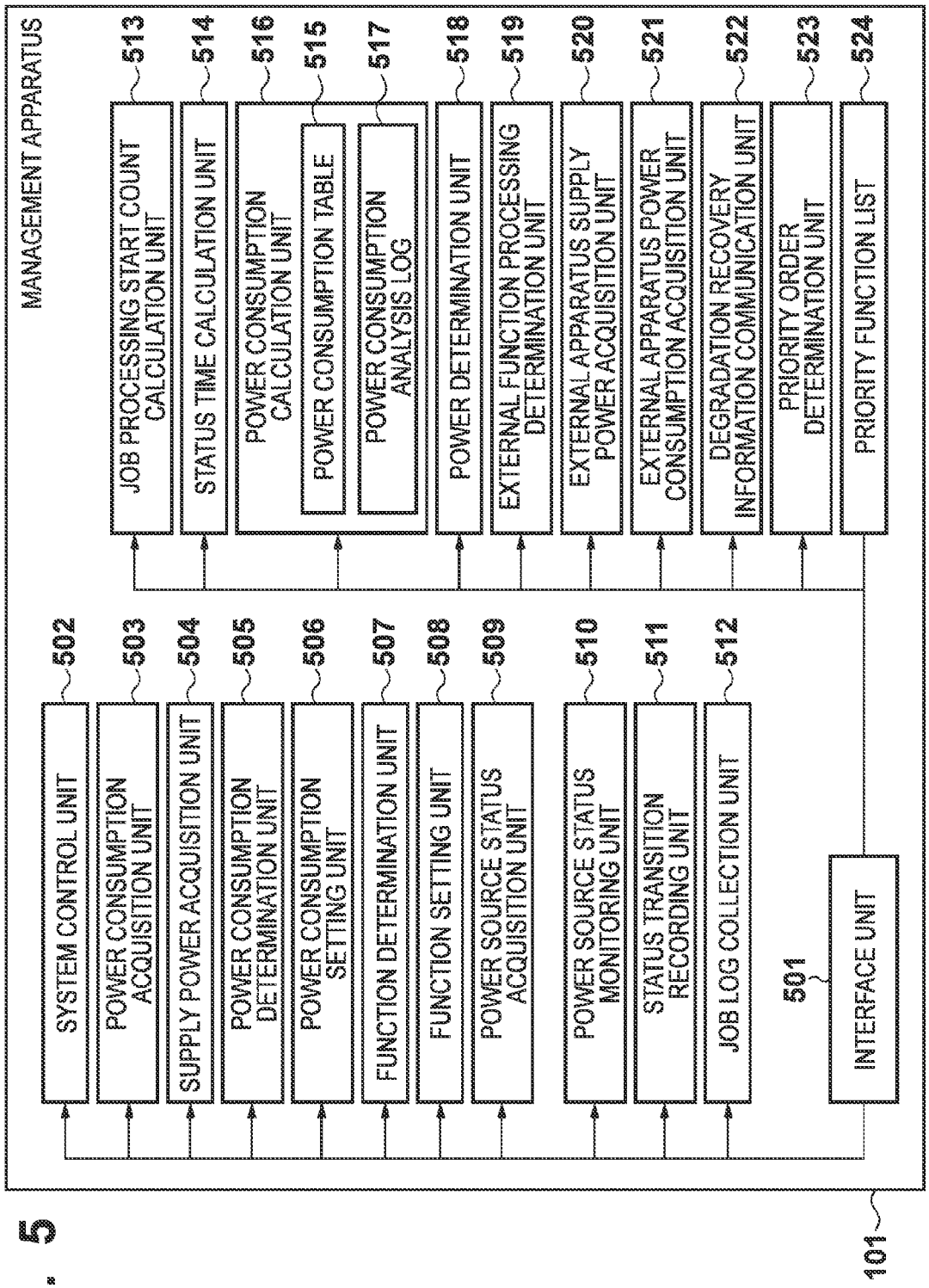
FIG. 5 is a block diagram showing an example of the arrangement of components of the management apparatus.

FIG. 5 is a block diagram for explaining an example of the arrangement of the management apparatus 101 shown in FIG. 1 according to this embodiment. An interface unit 501 communicates with the MFP A 102 via the NWC 8 shown in FIG. 2 and the LAN 100.

A system control unit 502 controls respective functions of the management apparatus 101. The system control unit 502 acquires information of image forming apparatuses such as the MFP A 102 as a plurality of management targets, and sets respective apparatuses. A power consumption acquisition unit 503 acquires power amounts to be consumed for respective functions from the power consumption control unit 413 of the MFP A 102.

A supply power acquisition unit 504 acquires supply power information from a power company which supplies an electric power to consumers on the power demand side. For example, OpenADR (see Demand Response Research Center, "OPEN AUTOMATED DEMAND RESPONSE COMMUNICATIONS SPECIFICATION (Version 1.0)", [online], April 2009, [search on Aug. 25, 2011], Internet <URL:http://openadr.lbl.gov/pdf/cec-500-2009-063.pdf>) specifies standard communication specifications required to exchange demand response signals between the power company which supplies an electric power and consumers on the power demand side. Note that information to be acquired by the supply power acquisition unit 504 of this embodiment and an acquisition method are not limited to the OpenADR. Information to be handled in this embodiment can be supply power information which can be acquired from the power company, and does not limit target scales such as the entire power company including management target apparatuses, specific buildings, and apparatuses, and types of supply power information. As supply power information to be acquired by the supply power acquisition unit 504, for example, 1 kW as a supply power upper limit value for the MFP A 102 as a management target apparatus, 10 kWh as an upper limit power amount during a specific period, and the like are acquired. Also, 100 kW as a supply power upper limit value of a building as a whole including the management target apparatus, 100 kWh as an upper limit power amount during a specific period, and the like can be acquired.

A power consumption determination unit 505 determines a possible power consumption of the image forming apparatus (MFP) according to the power consumption amounts for respective functions acquired by the power consumption acquisition unit 503 and the supply power information acquired by the supply power acquisition unit 504. A power consumption setting unit 506 makes power consumption settings of the MFP A 102 according to the power consumption determined by the power consumption determination unit 505.

A function determination unit 507 determines functions of the MFP A 102 according to the power consumption determined by the power consumption determination unit 505 and a use status of the MFP A 102. A function setting unit 508 makes function settings of the MFP A 102 according to the functions of the MFP determined by the function determination unit 507.

A power source status acquisition unit 509 acquires a power source status from the MFP A 102 as a management target of the management apparatus 101. More specifically, the power source status acquisition unit 509 acquires, from the MFP A 102, the power source status of the MFP A 102, which is acquired by the status log recording unit 412 and power consumption control unit 413.

A power source status monitoring unit 510 receives a power source status change notification from the MFP A 102 via the interface unit 501, and generates and stores status transition log information of the image forming apparatus as a management target. A status transition recording unit 511 periodically collects status transition log information generated by the power source status monitoring unit 510.

A jog log collection unit 512 periodically collects and stores job log information managed by the status log recording unit 412 of the MFP A 102 via the interface unit 501. In this periodic collection, job log information may be stored when the MFP A 102 transmits the job log information and the job log collection unit 512 receives that job log information.

The system control unit 502 executes analysis processing of the power consumption of the image forming apparatus such as the MFP A 102 based on the job log information collected by the job log collection unit 512 and the status transition log information generated by the power source status monitoring unit 510. A job processing start count calculation unit 513 calculates a count of job processes started by the MFP A 102 during a designated period based on job types included in pieces of job log information collected by the job log collection unit 512.

A status time calculation unit 514 calculates an accumulated time of times of respective power source statuses of the MFP A 102 during a designated period based on the status transition log information generated by the power source status monitoring unit 510.

A power consumption table 515 records in advance power consumptions in respective power source statuses of the MFP A 102 and that upon starting job processing. A power consumption calculation unit 516 calculates a power consumption by multiplying power consumptions in respective power source statuses of the MFP A 102 and the accumulated time of the respective power source statuses. A power consumption analysis log 517 is a log associated with power consumptions obtained from the job log information and power amounts consumed for respective functions from the MFP A 102.

A power determination unit 518 determines based on the supply power acquired by the supply power acquisition unit 504 and the power consumption acquired by the power consumption acquisition unit 503 whether or not the supply power to the MFP A 102 is insufficient. Whether or not the supply power is insufficient may be determined by checking whether or not an electric power required to operate a function requested by the user of those provided by the MFP A 102 is supplied. Alternatively, an insufficient supply power may be determined when all of the functions included in the MFP A 102 cannot be operated. An external function processing determination unit 519 determines whether or not functions of the MFP A 102 can be processed by the processing server 103 as an external apparatus.

An external apparatus supply power acquisition unit 520 acquires an electric power supplied to the processing server 103. An external apparatus power consumption acquisition unit 521 acquires power amounts consumed for respective functions of the processing server 103. A degradation recovery information communication unit 522 supplies degradation-recovery information of degraded functions of the MFP A 102 to the MFP A 102 when the power determination unit 518 detects recovery of the supply power.

A priority order determination unit 523 determines the power consumption of the MFP A 102 and a priority order of functions to be operated based on the power consumptions for respective functions of the MFP A 102 acquired by the power consumption acquisition unit 503 and the power consumption analysis log 517. The power consumption analysis log 517 is generated from pieces of job log information collected by the job log collection unit 512, and its configuration will be described later.

The priority order determination unit 523 generates a priority function list 524 for respective functions, and stops functions in turn from those having lower priority orders, thus reducing the power consumption. Functions to be degraded (stopped) are repetitively determined until the power consumption falls below the supply power.

(Processing Server)

Figure 6:
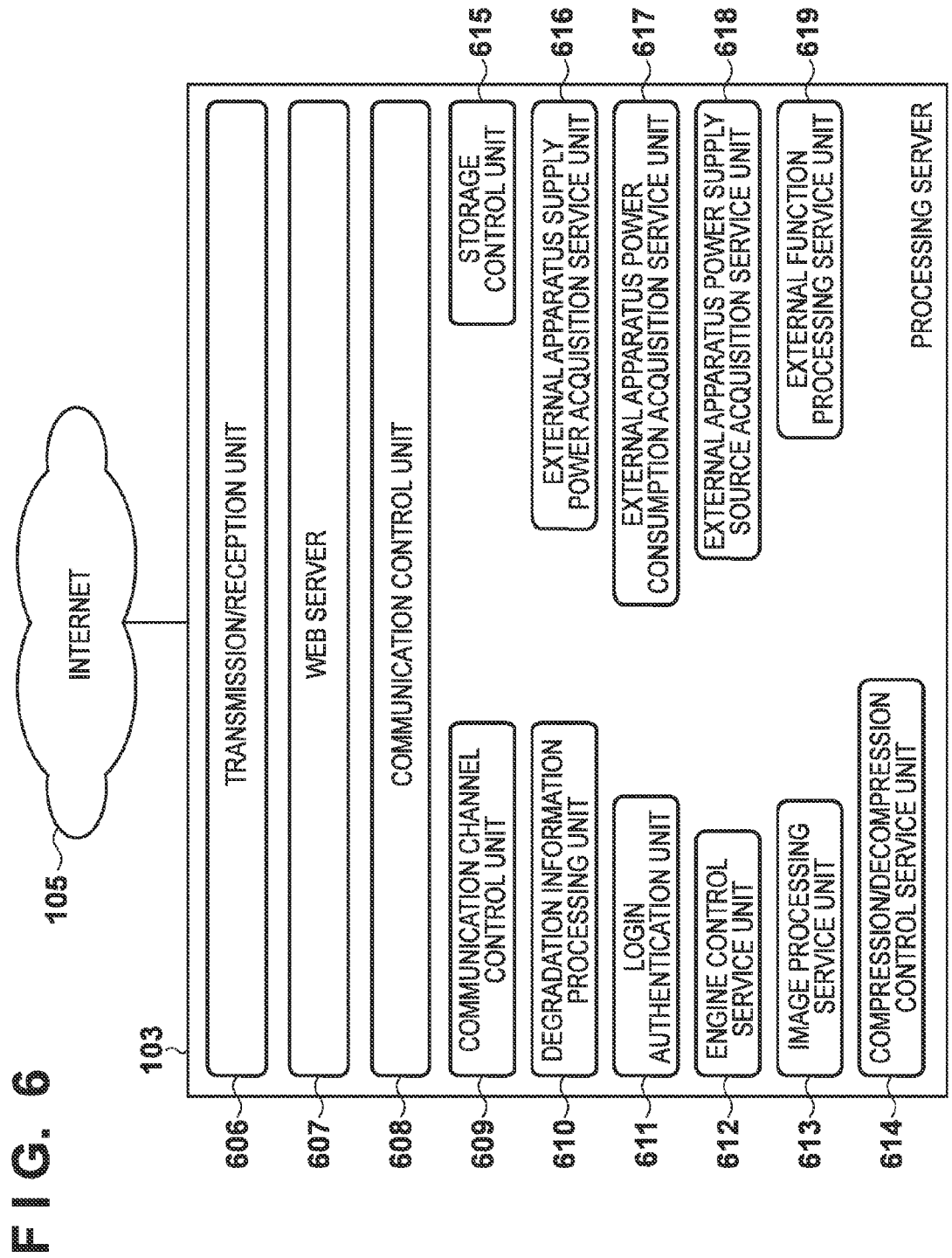
FIG. 6 is a block diagram showing an example of the software configuration of the processing server.

FIG. 6 is a block diagram for explaining an example of the arrangement of the processing server 103 shown in FIG. 1. A communication channel control unit 609 establishes and controls communication channels required for services to be provided by the processing server 103 in accordance with an instruction from the MFP A 102.

The MFP A 102 issues a channel control instruction to the communication channel control unit 609 according to a channel condition and channel limitations between the MFP A 102 and processing server 103, limitations by other apparatuses connected to the network, a load condition on the processing server 103, and the like. The MFP A 102 determines and establishes communication channels required for services to be provided by the processing server 103 using the communication channel determination unit 420 and communication channel establishing unit 421.

Services the processing server 103 can provide to the MFP A 102 change depending on the communication specifications which can be provided by the communication channel control unit 609. For example, the following communication specifications are defined and influence services which can be provided: a communication band, band limitation, communication delay time, availability of two-way communications, two-way communication method, availability of event transmission, event transmission method, event transmission delay time, communication charge, communication authority, available protocols, available port numbers, and the like. At this time, values in respective directions between the processing server 103 and MFP A 102 influence each other.

A degradation information processing unit 610 communicates with the degradation information communication unit 416 to specify degraded functions of the MFP A 102, and determines services the processing server 103 can provide to the MFP A 102. Also, the degradation information processing unit 610 communicates with the degradation information communication unit 416 to specify recovery locations of the MFP A 102, and controls the MFP A 102 to processes services alternatively processed by the processing server 103.

A login authentication unit 611 executes processing for receiving login request information as a login request from the user of the MFP A 102, executing authentication processing, and generating an authentication result. An engine control service unit 612, image processing service unit 613, and compression/decompression control service unit 614 alternatively execute processes of the engine control unit 406, image processing unit 407, and compression/decompression control unit 408 in the MFP A 102 when they are degraded.

The engine control service unit 612 alternatively executes the processing of the engine control unit 406 of the MFP. The engine control service unit 612 controls the print function in the MFP. The print function is controlled by controlling conveyance of sheets and the fixing device. The engine control service unit 612 controls to feed a paper sheet conveyed from the paper feed unit 303 to the fixing unit 304, and to transfer rendering data processed by the image processing unit 407 on the paper sheet as a transfer material. The fixing unit 304 attains printing by fixing toners on the paper sheet fed from the paper feed unit 303. Furthermore, the paper sheet printed by the fixing unit 304 is conveyed to the paper discharge unit 305.

The image processing service unit 613 alternatively executes the processing of the image processing unit 407 of the MFP. The image processing service unit 613 executes rasterize processing of a rendering command (PDL data and the like) to convert it into rendering data. The image processing service unit 613 also executes various kinds of color processing and processing based on engine specific information.

The compression/decompression control service unit 614 alternatively executes the processing of the compression/decompression control unit 408 of the MFP. The compression/decompression control service unit 614 executes compression and decompression of rendering data and the like. Note that since rendering data takes time in communication processing if it is transferred in a non-compressed state, a transfer time can be shortened by transferring compressed data. However, upon execution of image processing such as color conversion processing of rendering data, after compressed data is decompressed to rendering data, the rendering data has to be expanded on the RAM 404 to execute the image processing.

Note that when the image processing unit 407 is degraded, it is very difficult to alternatively execute its processing simply by the image processing service unit 613 when a broadband network such as the LAN 100 is not guaranteed and when a network limitation such as the firewall 104 exists.

In case of an image forming apparatus which can print a large number of pages per unit time, color print data, print data including many rendering objects, and the like, large-volume data is transferred between the image processing service unit 613 and compression/decompression control unit 408. For this reason, the loads on the communications and CPU are very high even in a network environment in which a broadband network such as the LAN 100 is guaranteed, resulting in poor processing efficiency.

For this reason, when the image processing unit 407 is degraded, the processing server 103 concurrently processes the processes of the image processing service unit 613 and compression/decompression control service unit 614 which require communications of large-capacity data. Thus, the loads on the communications and CPU can be reduced, and the output performance of print processing can be efficiently maintained.

In this way, even when some functions of the MFP A 102 are degraded, the processing server 103 can execute optimal processing by establishing required communication paths in consideration of the degradation information, communication channel information, and the like in the MFP A 102 and processing server 103.

Note that processing examples described in this embodiment do not limit the invention. For example, in addition to the engine control, image processing, and compression/decompression processing, the present invention is applicable to the following processes which can be executed by the printer and MFP: for example, PDL processing, RIP processing, color conversion processing, color management processing, font processing, LPD server processing, SNMP processing, WSD processing, encryption/decryption processing, paper discharge unit control processing, paper feed unit control processing, Web server processing, Web service processing, search processing, data conversion processing, mail client processing, file server processing, virtual computer processing, power management processing, storage management processing, communication processing, device management processing, log processing, maintenance processing, charge processing, user management processing, access management processing, and the like.

A storage control unit 615 executes alternative processing of the HDD 405 of the MFP A 102. Also, the storage control unit 615 executes alternative processing of data included in the MFP A 102 such as data in the ROM 403 and RAM 404 in the MFP A 102. The data included in the MFP A 102 include volatile and nonvolatile data such as firmware and software programs, or data managed by these programs.

Note that in this embodiment, when some functions of the MFP A 102 are required to be degraded due to an insufficient supply power, the MFP A 102 and processing server 103 autonomously control the processing server 103 to alternatively execute appropriate processing. However, such alternative processing may be implemented by receiving of a user instruction at the MFP A 102 or pre-configuring some or all of the components, processes, and operations of the MFP A 102 and system at the time of manufacture or delivery of the MFP A 102, or at the time of establishment of the system.

An external apparatus supply power acquisition service unit 616 acquires supply power information from the power company to the processing server 103. For example, the external apparatus supply power acquisition service unit 616 acquires supply power information of the power company by the OpenADR. As the supply power information acquired by the external apparatus supply power acquisition service unit 616, 1 kW as a supply power upper limit value to the processing server 103 as a management target apparatus or devices included in the processing server 103, 10 kWh as an upper limit power amount during a specific period, and the like are acquired. Also, 100 kW as a supply power upper limit value in a building or data center including the processing server 103 as a whole, 100 kWh as an upper limit power amount during a specific time, and the like are acquired.

An external apparatus power consumption acquisition service unit 617 acquires power amounts consumed for respective services to be provided by the processing server 103 or for respective functions. In this embodiment, pieces of power consumption information for respective services including the engine control service unit 612, image processing service unit 613, compression/decompression control service unit 614, and storage control unit 615, which are used by the MFP A 102, are acquired. Furthermore, the external apparatus power consumption acquisition service unit 617 acquires pieces of power consumption information for respective jobs or times processed by the engine control service unit 612, storage control unit 615, and the like. For this reason, power consumption amounts for respective jobs or functions processed by the processing server 103 can be measured.

An external apparatus power supply source acquisition service unit 618 acquires supply power source information used by the processing server 103. The supply power source information includes a power company type and a power generation type such as green power, non-green power, wind generation, photovoltaic generation, biomass power generation, micro hydro, and geothermal generation.

The external function processing determination unit 519 of the management apparatus 101 determines whether or not an external apparatus which operates using a second power supply source different from a first power supply source as a power supply source of the MFP A 102 processes the functions of the MFP A 102. By executing this determination processing, the processing server 103 which operates using the second power supply source alternatively processes degraded functions of the MFP A 102, thus reducing the power consumption of the MFP A 102. Note that when the external function processing determination unit 519 determines that the processing of the MFP A 102 can be alternatively executed by another apparatus, the function determination unit 507 determines to degrade (stop) the functions of the MFP A 102.

Since the supply power source information of the processing server 103 is different from the power supply source acquired by the supply power acquisition unit 504 of the management apparatus 101, further function degradation caused by an insufficient power of the MFP A 102 can be prevented.

An external function processing service unit 619 manages processing requests from the management apparatus 101 and MFP A 102 in the processing server 103, and controls alternative processing of related services in the processing server 103.

[Processing Sequence]

Figure 7:
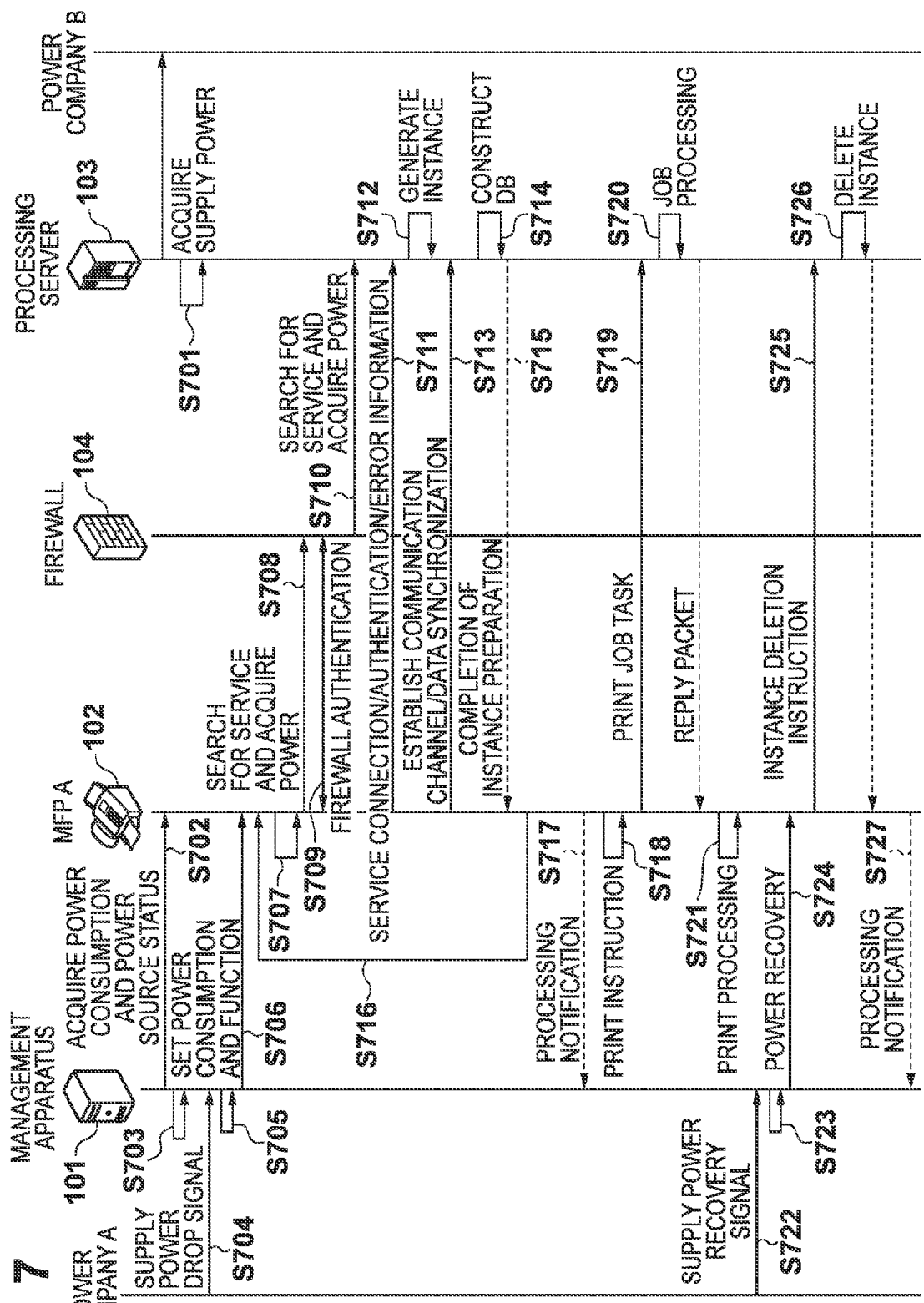
FIG. 7 is a chart showing an example of the sequence of processing between apparatuses.

FIG. 7 shows the processing sequence in the management apparatus 101, MFP A 102, processing server 103, firewall 104, and respective power companies according to this embodiment. Respective processes are implemented when CPUs included in respective apparatuses read out and execute programs stored in ROMs and the like as storage units.

In step S701, the external function processing service unit 619 of the processing server 103 issues an acquisition request of information of a supply power used by the processing server 103 to power company B. The external apparatus supply power acquisition service unit 616 of the processor server 103 acquires supply power information from power company B. For example, the processing server 103 acquires supply power information from power company B by the OpenADR.

Also, the external apparatus power consumption acquisition service unit 617 acquires power amounts consumed for respective services and functions provided by the processing server 103. In this embodiment, pieces of power consumption information are acquired for respective services provided by the engine control service unit 612, image processing service unit 613, compression/decompression control service unit 614, and storage control unit 615, which are used by the MFP A 102.

Furthermore, the external apparatus power supply source acquisition service unit 618 acquires supply power source information used by the processing server 103. The supply power source information includes a power company type, and a power generation type such as green power, non-green power, wind generation, photovoltaic generation, biomass power generation, micro hydro, and geothermal generation.

In step S701, the external function processing service unit 619 stores and manages these pieces of acquired information.

In step S702, the power consumption acquisition unit 503 of the management apparatus 101 acquires power amounts consumed for respective functions from the power consumption control unit 413 of the MFP A 102. Furthermore, the power source status acquisition unit 509 acquires a power source status from the MFP A 102 as a management target of the management apparatus 101. At this time, the power source status acquisition unit 509 acquires, from the MFP A 102, the power source status of the MFP A 102, which is acquired by the status log recording unit 412 and power consumption control unit 413. Also, the power source status monitoring unit 510 of the management apparatus 101 receives a power source status notification from the MFP A 102 via the interface unit 501, and generates and stores status transition log information.

In step S703, the status transition recording unit 511 of the management apparatus 101 collects and records status transition log information generated by the power source status monitoring unit 510. The job log collection unit 512 of the management apparatus 101 periodically collects and stores job log information managed by the status log recording unit 412 of the MFP A 102 via the interface unit 501. The system control unit 502 of the management apparatus 101 executes power consumption analysis processing of the image forming apparatus such as the MFP A 102 based on the collected job log information and status transition log information.

In step S704, the supply power acquisition unit 504 of the management apparatus 101 acquires supply power information from power company A which supplies an electric power to consumers on the power demand side. In this case, assume that information (signal) indicating a supply power drop is acquired.

In step S705, the power determination unit 518 of the management apparatus 101 compares the supply power acquired by the supply power acquisition unit 504 and the power consumption acquired by the power consumption acquisition unit 503 based on the supply power information acquired in step S704, thus determining whether or not the supply power is insufficient. If it is determined that the supply power is insufficient, the power consumption determination unit 505 of the management apparatus 101 determines the power consumption of the MFP based on the power consumptions for respective functions acquired by the power consumption acquisition unit 503 and the supply power acquired by the supply power acquisition unit 504 in step S706. Furthermore, the power consumption setting unit 506 of the management apparatus 101 makes power consumption settings of the MFP A 102 according to the power consumption determined by the power consumption determination unit 505. The function determination unit 507 of the management apparatus 101 determines the functions to be operated of the MFP A 102 in accordance with the power consumption determined by the power consumption determination unit 505 and a use status of the MFP A 102. The function setting unit 508 transmits these determined values to the MFP A 102, and sets the functions to be operated of the MFP A 102.

In step S707, the main controller unit 409 processes a power consumption drop instruction and function degradation instruction due to the supply power drop received by the network control unit 401 of the MFP A 102. At this time, the offload processing control unit 400 detects function degradation via the status detection unit 414. The detected degradation information is stored in the degradation information 415 by the status detection unit 414.

This embodiment will exemplify a case in which the compression/decompression control unit 408 of the MFP A 102 is degraded. Due to function degradation of the compression/decompression control unit 408 caused by an insufficient power, the offload processing control unit 400 of the main controller unit 409 determines that print processing cannot be continued. In this case, the offload processing control unit 400 issues a switching instruction to processing using an external apparatus (in this case, the processing server 103) to the function processing determination unit 419 in association with the print processing.

In this embodiment, as a trigger of issuance of the switching instruction of the processing to the external apparatus, detection of function degradation due to an insufficient power is used. However, a supply power drop to the MFP A 102 or a power equipment of a building which supplies a power to the MFP A 102 or a total supply power drop of the power company may be used as a trigger.

In step S708, the function processing determination unit 419 controls the function search unit 417 to search for an external apparatus which can execute processing equivalent to the compression/decompression control unit 408. The function search unit 417 notifies the function processing determination unit 419 of the compression/decompression control service unit 614 as a service which can execute processing equivalent to the compression/decompression control unit 408 in the processing server 103 as a search execution result. Note that a service search on the Internet need not always be conducted by the function search unit 417 by directly communicating with the processing server 103. For example, the function search unit 417 may search a directory server or the like for an end point or URI (Uniform Resource Identifier) of the processing server 103.

The search method of this embodiment does not limit the present invention, and the search method is not particularly limited. For example, a proactive search such as a broadcast search or multicast search or a reactive search such as DNS (Domain Name System) or directory service may be used. By conducting a search by combining the plurality of these methods, more search results can be obtained, needless to say.

In step S709, when the firewall 104 is located on a communication channel from the MFP A 102 to the processing server 103, the firewall 104 authenticates the MFP A 102 as a packet transmission source. The MFP A 102 can be authenticated by making authentication settings in the MFP A 102 in advance, or by authentication by communicating with an active directory server (not shown).

In general, the firewall 104 stores an authenticated IP address and port number, and permits communications from that address. Also, the firewall 104 permits a communication of a reply packet in the same session as a permitted packet. However, a communication of a different session from an apparatus outside the firewall 104 is not regarded as a reply packet, and the firewall 104 discards a packet. Note that when the network configuration does not include any firewall 104, this step can be omitted.

In step S710, the function processing determination unit 419 executes connection authentication of a service with the compression/decompression control service unit 614 of the processing server 103 to establish a connection. In this case, the authentication with the compression/decompression control service unit 614 is executed using a user authority of the MFP A 102 which uses the compression/decompression control service unit 614. Furthermore, after a channel is established, the degradation information communication unit 416 transmits degradation information to the processing server 103.

In step S711, the communication control unit 608 of the processing server 103 controls the communication channel control unit 609 to establish a communication channel, and the degradation information processing unit 610 to analyze the degradation information. In step S712, the compression/decompression control service unit 614 generates a new instance (virtual printer instance). Note that the instance indicates an entity of a data structure corresponding to the function to be executed by the processing server 103. An entity used to generate the instance varies depending on functions (services) to be executed. In this case, in order to alternatively execute compression/decompression processing of image data, the compression/decompression control service unit 614 generates a new instance.

Furthermore, in step S713, the communication channel establishing unit 421 establishes a channel which satisfies required communication specifications between the MFP A 102 and processing server 103. The communication specifications are determined by a value required for processing of the virtual printer instance of the compression/decompression control service unit 614. This value is determined together with the analysis result of the degradation information 415 and the determination results in the communication channel determination unit 420 and communication channel control unit 609.

The communication channel establishing unit 421 establishes a communication channel required for processing in the processing server 103. Packets of processing which requires communications using another session from the processing server 103 to the MFP A 102 are discarded by the firewall 104. As an example of such case, for example, when it is too late for the compression/decompression control unit 408 to transmit a reply packet in the same session as a request packet from the MFP A 102 to the processing server 103, packet transmission in another session is required.

For example, a packet transmission example in another session includes an event required to enhance the realtimeness of processing (a plurality of reply packets) and communications in a plurality of concurrent sessions required to make high-speed communications when a request packet is large. When the firewall 104 is located on the communication channel, such reply packet in a session different from a request packet is discarded. For this reason, the communication channel establishing unit 421 establishes communication channels required for processing by the compression/decompression control service unit 614 in advance. If insufficient processing performance of the communication channels is detected during processing of the compression/decompression control service unit 614, the communication channel establishing unit 421 similarly establishes communication channels required for processing.

When a band is insufficient, the communication channel establishing unit 421 establishes required communication channels by selecting a network card for a broader band or implementing broadband communications by bundling a plurality of network cards.

After required communication channels are established, in step S714, the offload processing control unit 400 executes data synchronization of the MFP A 102 with firmware and option information of the virtual printer instance, user data, device specific information, and the like, thus constructing a DB. Furthermore, the login authentication unit 611 executes data synchronization processing between the MFP A 102 and virtual printer instance.

In step S715, the processing server 103 notifies the MFP A 102 that construction of the virtual printer instance is complete, and processing of the virtual printer is ready to execute. In the subsequent processes, various data from the MFP A 102 are received by the communication control unit 608 in the processing server 103 via a transmission/reception unit 606 and Web server 607. In this case, the external function processing service unit 619 controls the communication channel control unit 609 used by the compression/decompression control service unit 614 to inspect communication channels, and to also determine the communication specifications of the communication channels used by the service. Furthermore, the degradation information processing unit 610 determines processing to be alternatively processed of the MFP A 102 from the degradation status of the MFP A 102.

However, when the compression/decompression control service unit 614 fails to establish required communication channels in the channel establishing processing of the communication channel establishing unit 421 of the MFP A 102, a fallback search of degradation occurrence functions is conducted. Then, degradation occurrence components are expanded to repeat the processes in steps S707 to S715.

The fallback search of the degradation occurrence functions will be practically described below. Assume that when the compression/decompression control service unit 614 requires a two-way communication band of 10 Gbytes/sec with the image processing unit 407, the communication channel establishing unit 421 fails to establish channels due to shortage of physical lines of 10 Gbytes/sec. To cope with this failure, both the functions of the image processing unit 407 and compression/decompression control unit 408 are processed by the compression/decompression control service unit 614 and image processing service unit 613 of the processing server 103. Thus, the communication channel establishing unit 421 allows processing using a two-way communication band of 100 Mbytes/sec. Furthermore, when the processing server 103 alternatively executes the controller function of the MFP A 102, a power consumption reduction of the MFP A 102 can be attained.

As described above, negotiation processing for offload-processing the degraded function due to a supply power drop to the MFP A 102 from the MFP A 102 to an external apparatus as the processing server 103 is complete.

In step S717, the main controller unit 409 notifies the management apparatus 101 of the power consumption received in step S706 and completion of the degraded function settings. At this time, the MFP A 102 notifies the management apparatus 101 of the power consumption determined by the function determination unit 507 and power consumption determination unit 505 of the management unit 101 and a setting instruction setting status according to a use status of the MFP A 102. In step S717, the MFP A 102 is in a degraded function status caused by a supply power drop. At this time, the MFP A 102 completes the negotiation processing for the offload processing with the processing server 103.

In step S718, the MFP A 102 is ready to receive a print instruction from the user. At this time, the MFP A 102 receives a print instruction from the user via the UI unit 302. In step S719, the offload processing control unit 400 of the main controller unit 409 of the MFP A 102 transfers data required to execute alternative processing in the processing server 103 to the processing server 103.

In step S720, the image processing service unit 613 and compression/decompression control service unit 614 execute image processing of job data transmitted in step S719. Note that an entity used to execute processing in the processing server 103 varies depending on functions to be provided. Subsequently, the processing server 103 replies an image processing result to the MFP A 102.

In step S721, the MFP A 102 processes the image processing result received in step S720 using the main controller unit 409 and executes print processing via the engine control unit 406. After that, in step S722, the supply power acquisition unit 504 of the management apparatus 101 acquires supply power information from power company A which supplies an electric power to consumers. The following description will be given under the assumption that the supply power information acquired in this step is information (signal) indicating that a supply power is recovered from power company A.

In step S723, the power determination unit 518 of the management apparatus 101 determines that the insufficient supply power is recovered, based on the supply power acquired by the supply power acquisition unit 504 and the power consumption acquired by the power consumption acquisition unit 503 according to the information acquired in step S722. In step S724, the system control unit 502 notifies the MFP A 102 of recovery of the supply power determined by the power determination unit 518.

In step S725, the function control unit 422 of the MFP A 102 executes control for switching the entity of the processing "from the processing server 103 to the MFP A 102" upon recovery of the supply power. For example, the processes executed by the image processing service unit 613 and compression/decompression control service unit 614 of the processing server 103 are executed by the image processing unit 407 and compression/decompression control unit 408 of the MFP A 102. Furthermore, the function control unit 422 of the MFP A 102 issues a function stop instruction of the image processing service unit 613 and compression/decompression control service unit 614 of the processing server 103 as processing for switching processing "from the processing server 103 to the MFP A 102" upon recovery of the supply power.

In step S726, the external function processing service unit 619 of the processing server 103 deletes instances of the image processing service unit 613 and compression/decompression control service unit 614 to stop their processes. At this time, the external function processing service unit 619 notifies the MFP A 102 of setting information held by the instances of the image processing service unit 613 and compression/decompression control service unit 614. Thus, the user of the MFP A 102 can execute processing by inheriting the settings from the processing server 103.

In step S727, the function control unit 422 of the MFP A 102 sends a notification to the system control unit 502 of the management apparatus 101, thereby rewriting a device management database of the management apparatus 101. Note that in this embodiment, the firewall 104 is included as an example of a limitation on the communication channel and a change in communication status. However, the firewall 104 is not indispensable as the component of the present invention.

As described above, according to this embodiment, an image forming system in which when a function degradation occurs due to an insufficient supply power, the image forming apparatus can autonomously avoid function degradation even when the communication channel suffers communication channel limitations such as the firewall, band limitation, and transmission delay can be provided. Also, even in the network environment including the firewall, realtime communications and broadband, high-speed communications can be made from an apparatus outside the firewall, thus providing an appropriate error processing service. Furthermore, at the time of occurrence of function degradation due to an insufficient power of the image forming apparatus, appropriate functions can be processed by the external apparatus, thus allowing to continuously using the image forming apparatus.

With this processing, for example, when power company A is that which executes photovoltaic generation and biomass power generation, it cannot execute the photovoltaic generation during nighttime and a supply power amount considerably drops. However, power company B is located at a place having a time difference of about 12 hours from power company A, and a processing server of a data center using a power source of power company B may often execute the photovoltaic generation.

In this case, when MFP A is operated using a power source of power company A, and the processing server is operated using a power source of power company B as a different power system, the power consumption of power company A which suffers an insufficient power is reduced, and the server of power company B having a sufficient supply power amount is used. In this way, the power consumption amount of power company A can be reduced without impairing the functions of MFP A.

When a plurality of data centers in each of which the processing server is operating are installed, the processing server which is optimal to operate MFP A is determined based on pieces of power information acquired by respective units of the processing servers. As the optimal processing server, that having the best operating condition, power status, power price, and the like can be selected.

According to the present invention, a management system which is efficient for multi-function apparatuses such as an image forming apparatus and MFP and an apparatus configured by a plurality of hardware components and software services as power control target apparatuses can be provided.

A power control system which can control a plurality of apparatuses or a plurality of functions and can prevent user's convenience from being considerably impaired when power suppression is effectively attained using demand response signals can be provided.

Furthermore, a management system which can operate respective functions by an external apparatus of a different power source system even when a supply power amount fluctuates largely can be provided.

The embodiment of the present invention has been described in detail above. However, the present invention may be applied to a system including a plurality of devices. Alternatively, the present invention may be applied to an apparatus including one device as well as a case in which the apparatus is configured by a virtual OS or the like. Furthermore, the present invention may be applied to a cloud computing system in which information processing apparatuses are connected via the Internet.

Second Embodiment

Figure 8:
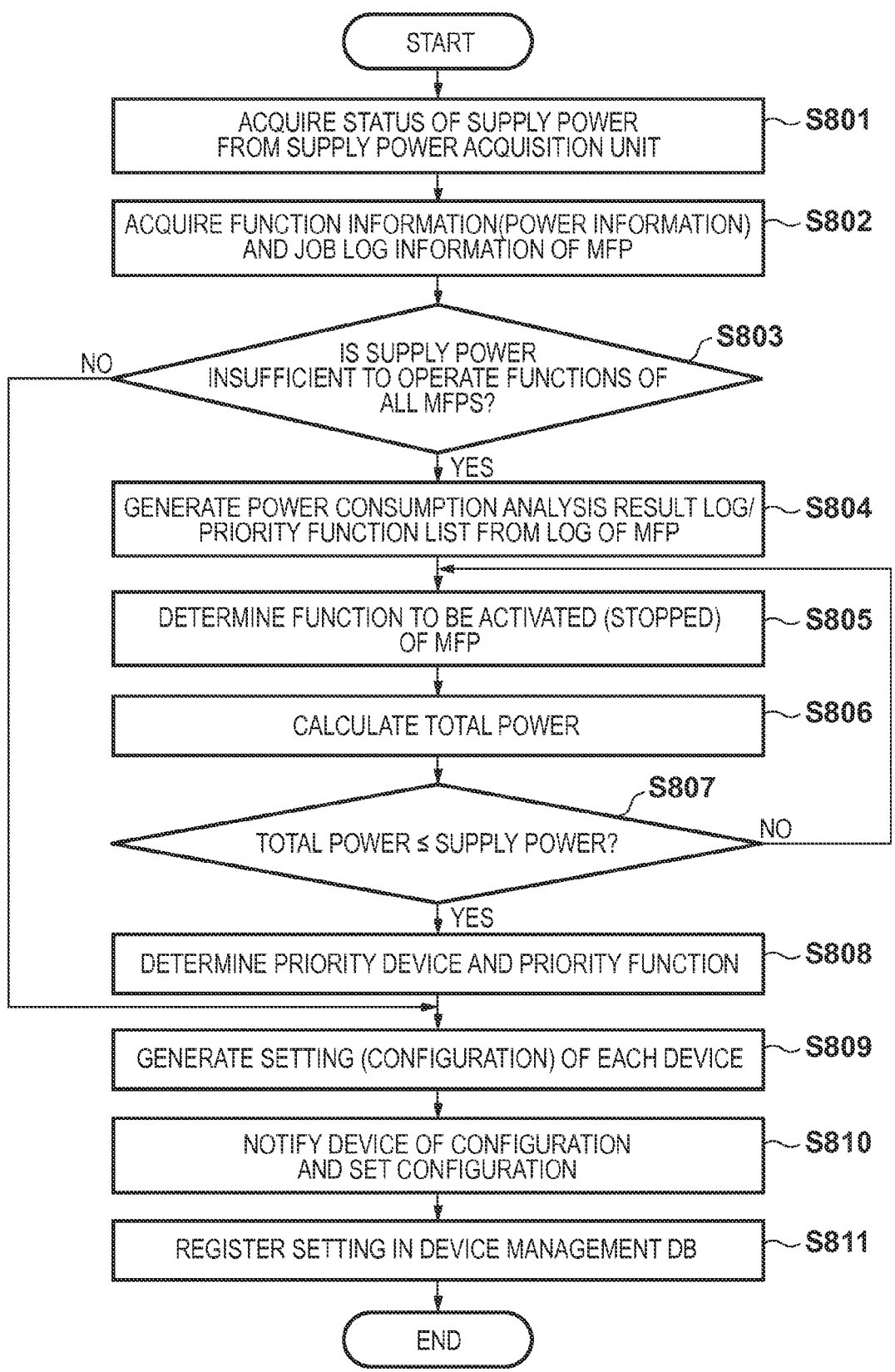
FIG. 8 is a flowchart of control in the management apparatus according to the second embodiment.

The control sequence of the management apparatus 101 when the system includes a plurality of MFPs according to this embodiment, for example, the MFP A 102 and an MFP B 106 shown in FIG. 1 will be described below with reference to FIG. 8. This processing sequence is implemented when the CPU included in the management apparatus 101 reads out a program stored in the ROM or the like as a storage unit and executes the readout program.

In this embodiment, a power consumption reduction and degradation of functions caused by an insufficient supply power are selected from the plurality of MFPs and functions of the MFPs, and the respective MFPs are set. Note that this embodiment will explain the two MFPs as the plurality of MFPs, but the present invention is not limited to this.

In step S801, the supply power acquisition unit 504 acquires supply power information from power company A to consumers. For example, the supply power information is not limited to target scales such as the entire power company including a management target apparatus and a specific building and apparatus, and a type of supply power information as long as it can be acquired from power company A. As the supply power information acquired by the supply power acquisition unit 504, for example, 1 kW as a supply power upper limit value to the MFP A 102 as a management target apparatus, 10 kWh as an upper power amount during a specific period, and the like can be acquired. Also, 100 kW as a supply power upper limit value in the entire building including the management target apparatus, 100 kWh as an upper limit power amount during a specific period, and the like can be acquired.

In step S802, the power consumption acquisition unit 503 acquires power consumptions for respective functions from the MFPs to be managed and jog log information managed by the status log recording units 412 of the MFPs from the job log collection unit 512.

The power consumption determination unit 505 checks in step S803 whether or not a power consumption reduction and function degradation of each MFP are required. The power consumption determination unit 505 checks whether or not a supply power is insufficient to operate all the MFPs and functions based on the power consumptions of the plurality of MFPs and functions acquired by the power consumption acquisition unit 503 and the supply power acquired by the supply power acquisition unit 504. That is, the power consumption determination unit 505 checks whether or not the power consumptions and functions for the respective MFPs are required based on the supply power and power consumptions.

If it is determined that the supply power is not insufficient (NO in step S803), the process jumps to step S809. If it is determined that the supply power is insufficient (YES in step S803), the priority order determination unit 523 generates the priority function list 524 from the power consumption analysis log 517 in step S804. FIG. 10 shows an example of the power consumption analysis log 517 and FIGS. 11A and 11B show examples of the priority function lists 524 when the plurality of MFPs are to be managed. The power consumption setting unit 506 makes power consumption settings of the respective MFPs according to power consumptions based on use frequencies of the respective image forming apparatuses in the log. The function determination unit 507 determines the functions of the respective MFPs according to the power consumptions determined by the power consumption determination unit 505 and use statuses of the MFPs acquired from the log.

In step S805, the power consumption determination unit 505 determines functions to be activated or stopped of the plurality of MFPs. In step S806, the power consumption determination unit 505 calculates a total power from a sum total of the functions to be activated of the plurality of MFPs. The power consumption determination unit 505 confirms in step S807 whether or not the total power is equal to or smaller than the supply power. When the processes in steps S805 to S807 are repeated, and the total power for the plurality of MFPs becomes equal to or smaller than the supply power (YES in step S807), the respective functions of the MFPs are determined. In this case, if the supply power is insufficient (NO in step S807), the functions with lower priority orders are degraded (stopped) so as to reduce the power consumption. The functions with lower priority orders are stopped until the power consumption falls below the supply power (S805, S806).

In step S808, the power consumption determination unit 505 makes settings according to the determined priority function list 524. In step S809, the function setting unit 508 generates pieces of setting information (configuration) of the respective MFPs so as to make function settings of the respective MFPs in accordance with the functions of the MFPs determined by the power consumption determination unit 505 and function determination unit 507.

In step S810, the system control unit 502 notifies the respective MFPs of the corresponding setting information of the respective MFPs, and controls the MFPs to make settings. In step S811, the system control unit 502 registers the generated settings in the device management DB.

FIG. 9 shows an example of registration information of the device management DB. A Device identifier 901 is that required to uniquely specify a device such as an MFP. An address 902 is an identifier which represents a location on a communication channel and a connection port. A function 903 indicates a unit used to tally power consumptions. In this embodiment, the function includes "Color Print", "Storage", "B/W Print", and the like. For example, more flexible control can be attained by individually executing log collection and database registration for respective controller boards of an MFP. A status 904 indicates an operation status of the function 903 which influences a power consumption amount. A power consumption 905 indicates that in a specific component status. Note that the configuration of the registration information is not limited to that shown in FIG. 9, and items which allow more detailed settings may be included according to the functions of an MFP.

FIG. 10 shows an example of the power consumption analysis log 517 held by the power consumption calculation unit 516. Log items 1001 indicate examples of items included in the power consumption log. Columns "MFP A" 1002, "MFP B" 1003, and "MFP C" 1004 indicate examples of log values of a plurality of MFPs included in the system according to this embodiment.

As an example of a method of determining a priority order of functions from the power consumption analysis log 517 by the priority order determination unit 523, for example, a method of calculating a power efficiency (FAX) for a FAX function from a FAX transmitted page count and FAX power consumption per month is available.

FIG. 11A shows an example of the priority function list 524 generated from the power consumption analysis log 517 as a determination example of the priority order for the plurality of MFPs. Note that the power efficiency to be consumed by a function per unit time can also be calculated using other values. Also, a method of selecting these values by the user is available.

The priority order determination unit 523 generates a list in an order of an MFP B 1102, MFP A 1103, and MFP C 1104, as indicated by an order 1101 in FIG. 11A in association with the priority order of the power efficiency (FAX).

In FIG. 11A, when the power consumption determination unit 505 determines 5 W as a supply power of the FAX function, the function determination unit 507 determines that only the MFP B with the top priority order can operate. When the supply power of the FAX function is 5 W, the FAX functions of the MFPs A and C are stopped.

As can be seen from the above description, the power consumption amount when the FAX function is consolidated on the MFP B can be reduced based on FAX standby power consumptions and operating times of the MFPs A and C whose FAX function is to be stopped.

Furthermore, when the FAX function of the MFP B is also stopped and is processed by an external apparatus, the power consumptions of the management target MFPs of the management apparatus 101 can be reduced by processing the power consumption of the FAX function of the MFP B by an external apparatus of a different power source system (different power company).

As another method of determining a priority order of functions from the power consumption analysis log 517 by the priority order determination unit 523, a method of determining the priority order based on a use efficiency in addition to the power efficiency is available. The use efficiency can be determined by checking how many times a specific function is used per unit time, how many times a specific function is used per user, or the like.

As still another method of determining a priority order of functions from the power consumption analysis log 517 by the priority order determination unit 523, a method of determining the priority order based on a processed count of a function in addition to the power efficiency is available. For example, when the priority order is determined based on a printed page count of the log items 1001 shown in FIG. 10, a priority order of an MFP A 1106 having a printed page count=25677 pages, an MFP B 1107 having a printed page count=623 pages, and an MFP C 1108 having a printed page count=123 pages is determined, as indicated by an order 1105 in FIG. 11B.

Likewise, when the priority order of a plurality of functions of a single MFP is to be determined, the priority order determination unit 523 can generate the priority function list 524 from the power efficiencies, use efficiencies, and processed counts of these functions.

As yet another priority order determination method, the priority order can also be determined for different functions of the plurality of MFPs. For example, page counts of different functions (the printed page count of the MFP A and the FAX transmitted page count of the MFP B) may be compared, or the power efficiencies of different functions may be compared. In this case, in place of simply comparing the power efficiencies, coefficients are set in advance for respective functions, and the priority function list 524 may be generated by comparing the power efficiencies or processed counts in consideration of the coefficients.

According to the aforementioned embodiment, even for a plurality of image forming apparatuses each having a plurality of functions, an image forming system in which the image forming apparatuses can autonomously avoid function degradation when function degradation occurs in the image forming apparatuses due to an insufficient supply power can be provided.

Third Embodiment

This embodiment will explain display and setting methods of supply power amounts, power consumption amounts, and functions of MFPs collected by a management apparatus. The arrangement and processing sequence are the same as those of the aforementioned embodiment.

[Power Consumption Analysis Result Graph]

Figure 12A:
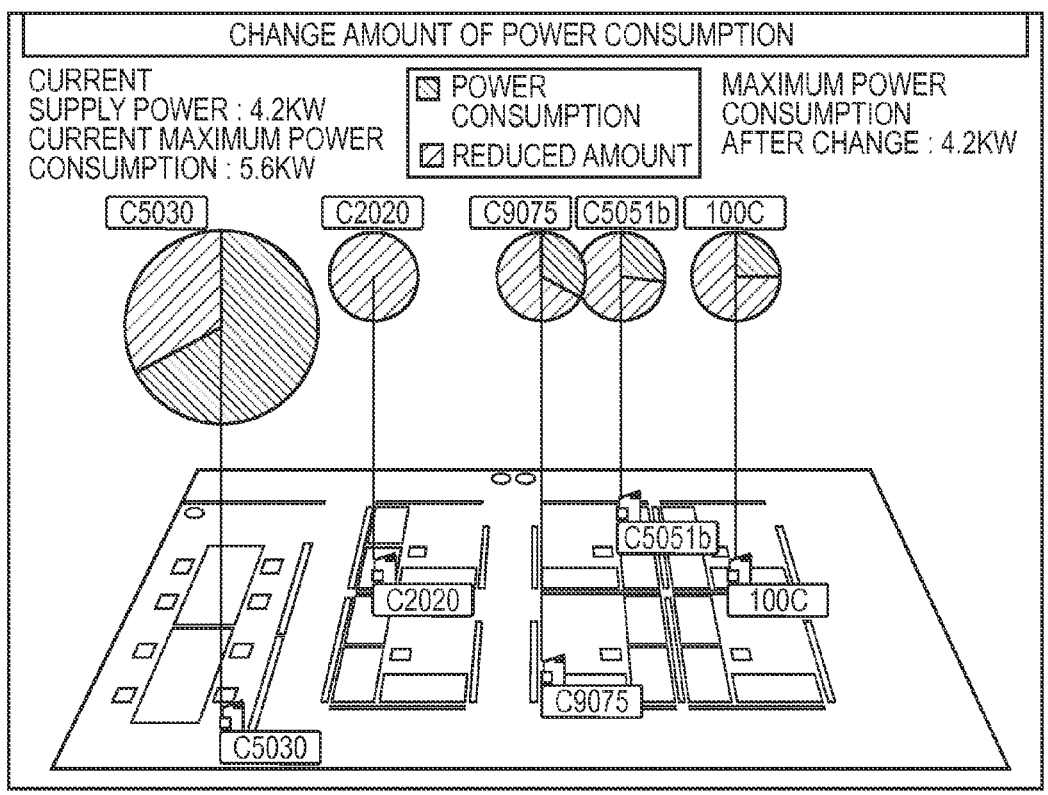
FIGS. 12A and 12B show supply power/power consumption display examples according to the third embodiment.
Figure 12B:
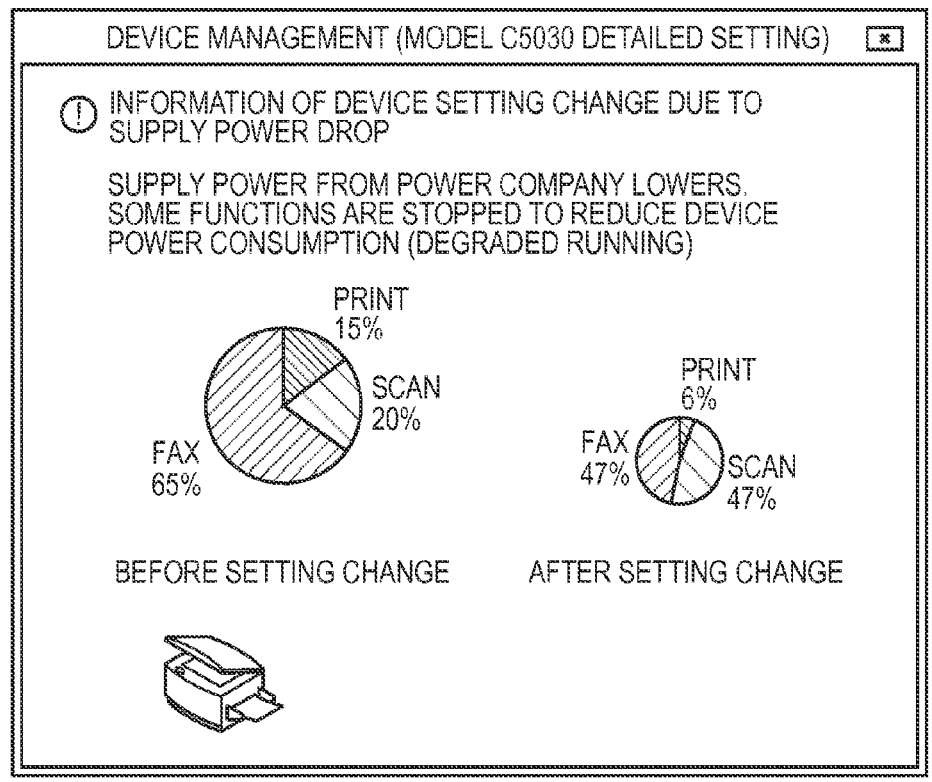

FIGS. 12A and 12B show examples of power consumption analysis results and setting graphs (to be referred to as power consumption analysis result graphs hereinafter) for respective image forming apparatuses according to this embodiment. The power consumption analysis result graphs for respective image forming apparatuses shown in FIG. 12A are displayed on a UI unit (not shown) of a client PC (not shown) based on values of the power consumption calculation unit 516. The power consumption analysis result graphs for respective image forming apparatuses are those of power consumptions of the power consumption table for the respective image forming apparatuses. Also, a supply power source and supply power are displayed together. Note that the UI unit described above corresponds to, for example, display using a WEB browser included in the client PC.

In the power consumption analysis result graphs for respective image forming apparatuses, icons indicating positions of the image forming apparatuses are located on a map image, and power consumptions are displayed using circle graphs in correspondence with the icons indicating the image forming apparatuses. A size of each circle graph indicates the magnitude of a power consumption. Also, ratios of power consumptions in respective statuses are displayed as the breakouts of the circle graph. Thus, the power consumptions for the respective image forming apparatuses can be visually recognized. By clicking the power consumption icon for each MFP and functions, detailed settings of these functions can be made while confirming power consumptions, as shown in FIG. 12B. By changing a display size of each circle graph and icon on the screen, power consumption settings can be arbitrarily changed. Note that a graph of total values of power consumptions and the like in a specific area may be displayed together.

Furthermore, by displaying supply powers for different power source systems such as power companies and private photovoltaic generation, the user can confirm and set functions of each MFP with their supply power ranges while confirming power supply and demand.

Figure 13A:
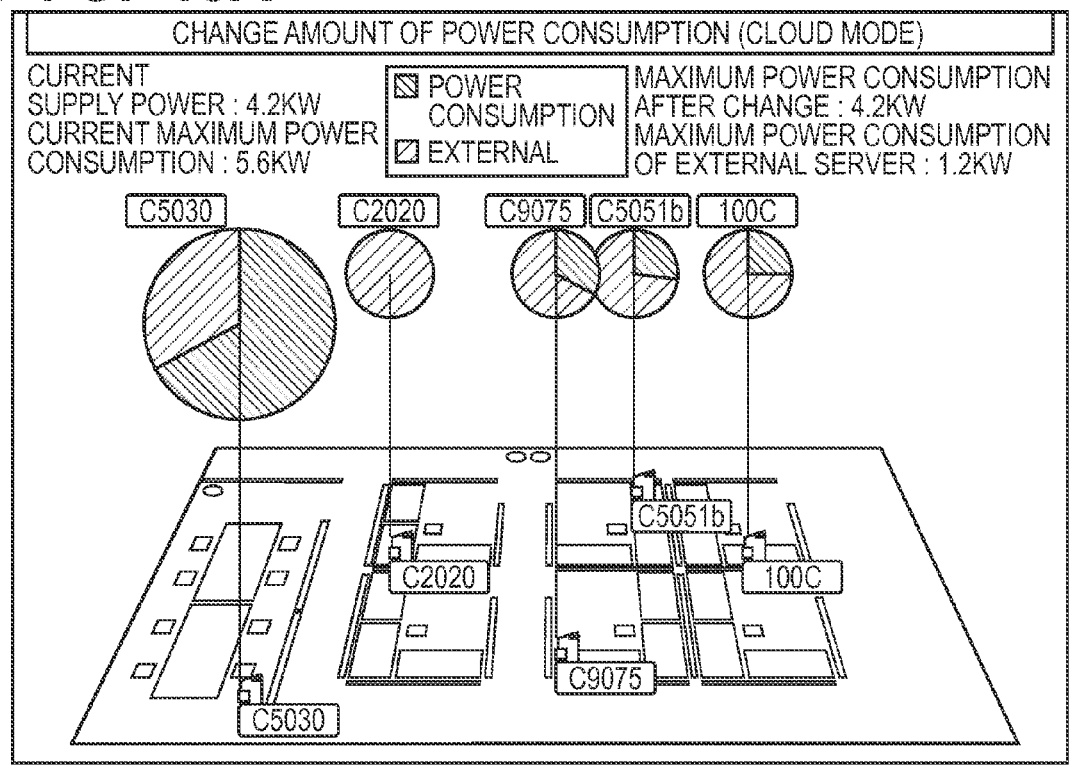
FIGS. 13A and 13B show supply power/power consumption display examples according to the third embodiment.
Figure 13B:
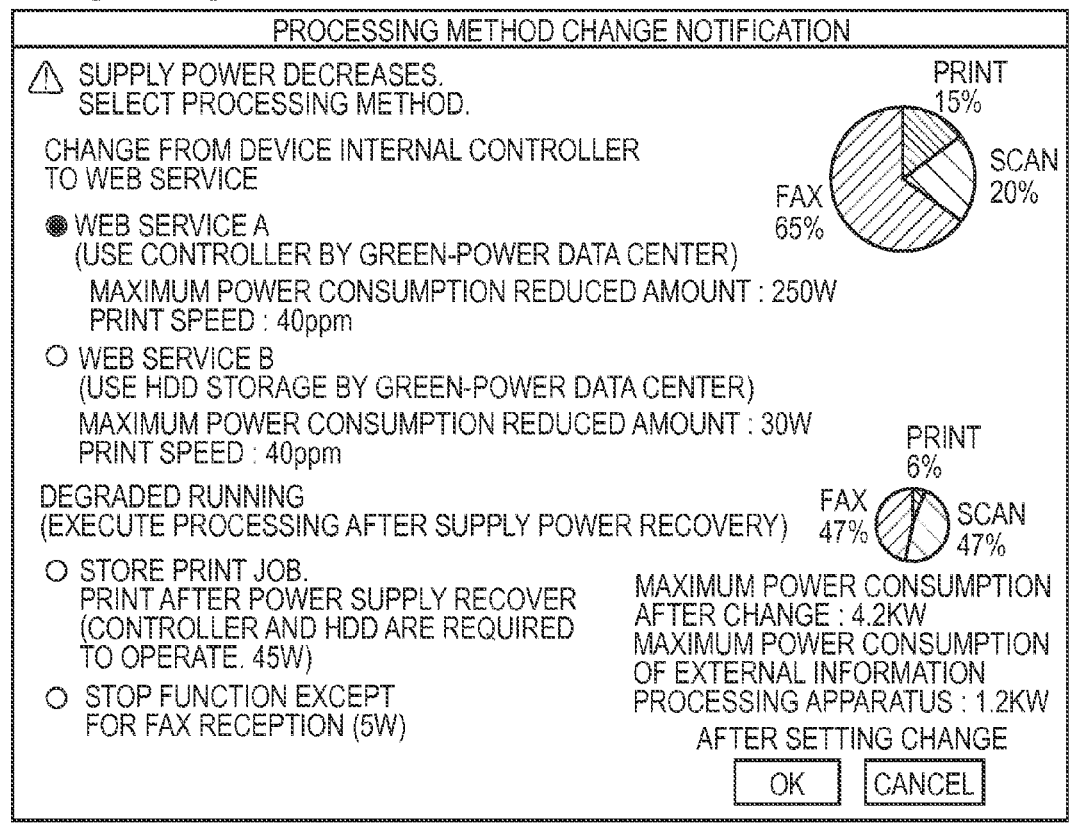

FIGS. 13A and 13B show examples of power consumption analysis results and setting graphs for respective image forming apparatuses including the processing server 103 according to the present invention. Power consumption analysis result graphs for the respective image forming apparatuses shown in FIG. 13A are displayed on a UI unit (not shown) of a client PC (not shown) based on values of the power consumption calculation unit 516. Note that the UI unit described above corresponds to, for example, a WEB browser included in the client PC.

The power consumption analysis result graphs for respective image forming apparatuses are those of power consumptions of the power consumption tables for the respective image forming apparatuses, as shown in FIG. 13A. Furthermore, when function degradation occurs in image forming apparatuses, and the processing server 103 executes processing of that image forming apparatuses, a supply power amount, power consumption amount, and supply power source information of the processing server 103 are displayed together with pieces of power source information of the image forming apparatuses. In the power consumption analysis result graphs for the respective image forming apparatuses, icons indicating the positions of the image forming apparatuses are located on a map image, and circle graphs display power consumptions in correspondence with the icons indicating the image forming apparatuses.

A size of each circle graph indicates the magnitude of a power consumption. Also, by displaying a power source system such as an external apparatus different from the image forming apparatuses and power consumptions for respective functions, the power consumptions for respective image forming apparatuses can be visually confirmed.

By clicking the power consumption icon for each MFP and functions, detailed settings of these functions can be made while confirming power consumptions, as shown in FIG. 13B. Also, as shown in FIG. 13B, an alternative function to an external apparatus may be displayed in items selectable by the user. In this manner, by displaying supply powers and settings for respective power supply systems, the user can confirm and set the functions of each MFP within their supply power ranges while confirming power supply and demand. When a selection item which can be set by the user is selected, graphs before and after the setting change, which are associated with that setting item, may be displayed. By changing a display size of each circle graph and icon on the screen, power consumption settings can be arbitrarily changed.

Note that the screen configurations shown in FIGS. 12A and 12B and FIGS. 13A and 13B are merely examples, and screens to be displayed may have other configurations.

[List Database]

FIG. 14 shows a configuration example of a list database of services which are provided by an external apparatus and are displayed on the detailed setting screen of power consumption changes shown in FIG. 13B. A Web service identifier 1401 indicates that of a service provided by the external apparatus. The Web service identifier 1401 is used to uniquely identify a Web service used by each MFP. A service 1402 indicates a service type of a Web service used by each MFP. A unit power consumption 1403 indicates a power consumption amount per service providing unit (charge unit) of a Web service. A power unit price 1404 indicates a power price per unit power amount. From the power consumption of the unit power consumption 1403, a power fee according to each service provided by a Web service can be calculated. A power source 1405 includes a type of a supply power, power company information, and power source system information.

According to this embodiment, the user can easily confirm and set supply power amounts to the image forming apparatuses managed by the management apparatus, and power consumption amounts and functions of the respective image forming apparatuses. For this reason, an image forming system in which when function degradation occurs in the respective image forming apparatuses set by the management apparatus due to an insufficient supply power, the user can change these settings to desired settings can be provided.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-266277, filed Dec. 5, 2011, which is hereby incorporated by reference herein in its entirety.

What is claimed is:

1. A management system which includes an image forming apparatus having a plurality of functions, a management apparatus which manages the image forming apparatus, and an external apparatus, said management apparatus comprising:

a power consumption acquisition unit configured to acquire information of power consumptions for the respective functions of the image forming apparatus;

a supply power acquisition unit configured to acquire information of a supply power to be supplied to the image forming apparatus;

a power consumption determination unit configured to determine a power consumption value to be consumed by the image forming apparatus based on the information of the power consumptions for the respective functions acquired by said power consumption acquisition unit and the information of the supply power acquired by said supply power acquisition unit;

a function determination unit configured to determine functions to be operated of the plurality of functions included in the image forming apparatus so as to be operated at the power consumption value determined by said power consumption determination unit;

a function setting unit configured to set the image forming apparatus to operate the functions determined by said function determination unit;

a power determination unit configured to determine based on the information of the supply power acquired by said supply power acquisition unit and the information of the power consumptions acquired by said power consumption acquisition unit whether or not the supply power required to operate the functions of the image forming apparatus is insufficient;

an external function processing determination unit configured to determine, when the supply power required to operate the functions of the image forming apparatus is insufficient, whether or not a function of the image forming apparatus is allowed to be alternatively processed by the external apparatus; and an instruction unit configured to instruct, when said external function processing determination unit determines that the function is allowed to be alternatively processed by the external apparatus, the image forming apparatus to process a job by the external apparatus;

wherein the image forming apparatus comprises a control unit configured to switch the job to execution by the external apparatus upon reception of the instruction to process the job by the external apparatus from said instruction unit.

2. The system according to claim 1,
wherein a power supply source of the image forming apparatus is different from a power supply source of the external apparatus.

3. The system according to claim 1, wherein when said external function processing determination unit determines that the function is allowed to be alternatively processed by the external apparatus, said function determination unit determines to stop the function of executing the corresponding processing in the image forming apparatus.

4. The system according to claim 1, wherein said management apparatus further comprises a communication unit configured to notify the image forming apparatus of a message indicating that the functions of the image forming apparatus are allowed to be operated when said power determination unit determines that the insufficient power supply is recovered, and
wherein said control unit switches from execution by the external apparatus to execution by the functions of the image forming apparatus for the job.

5. The system according to claim 1, wherein the image forming apparatus includes a plurality of image forming apparatuses,
said management apparatus further comprises;
a job log collection unit configured to collect and analyze logs of jobs respectively processed by the plurality of image forming apparatuses; and
a priority order determination unit configured to determine a priority order of functions to be operated of the plurality of image forming apparatuses based on the analysis result of said job log collection unit, and wherein said function determination unit determines the functions to be operated in accordance with the priority order determined by said priority order determination unit.

6. The system according to claim 1, wherein said management apparatus comprises a display unit configured to display at least one of a supply power, a power supply source, and a power consumption for the image forming apparatus.

7. The system according to claim 6, wherein said display unit displays a stopped function when the supply power to the image forming apparatus lowers, and a power consumption when the function is stopped.

8. The system according to claim 6, wherein said display unit locates a graph which displays magnitudes of the supply power and the power consumption of the image forming apparatus in correspondence with a display size on a map image on which an icon indicating a position of the image forming apparatus is located.

9. The system according to claim 8, wherein said display unit receives a setting for the power consumption or functions of the image forming apparatus indicated by the icon or the graph when a user changes a display size of the icon or the graph.

10. The system according to claim 6, wherein said display unit displays settings for functions of the image forming apparatus, which are selectable by a user when the supply power to the image forming apparatus lowers, and
the settings are displayed in association with a power consumption after the settings are changed.

11. A management apparatus which manages an image forming apparatus having a plurality of functions, comprising:
a power consumption acquisition unit configured to acquire information of power consumptions for the respective functions of the image forming apparatus;
a supply power acquisition unit configured to acquire information of a supply power to be supplied to the image forming apparatus;
a power consumption determination unit configured to determine a power consumption value to be consumed by the image forming apparatus based on the information of the power consumptions for the respective functions acquired by said power consumption acquisition unit and the information of the supply power acquired by said supply power acquisition unit;
a function determination unit configured to determine functions to be operated of the plurality of functions included in the image forming apparatus so as to be operated at the power consumption value determined by said power consumption determination unit;
a function setting unit configured to set the image forming apparatus to operate the functions determined by said function determination unit;
a power determination unit configured to determine based on the information of the supply power acquired by said supply power acquisition unit and the information of the power consumptions acquired by said power consumption acquisition unit whether or not the supply power required to operate the functions of the image forming apparatus is insufficient;
an external function processing determination unit configured to determine, when the supply power required to operate the functions of the image forming apparatus is insufficient, whether or not a function of the image forming apparatus is allowed to be alternatively processed by an external apparatus; and an instruction unit configured to instruct, when said external function processing determination unit determines that the function is allowed to be alternatively processed by the external apparatus, the image forming apparatus to process a job by the external apparatus;

wherein the image forming apparatus comprises a control unit configured to switch the job to execution by the external apparatus upon reception of the instruction to process the job by the external apparatus from said instruction unit.

12. A management method of an image forming apparatus having a plurality of functions, comprising:

acquiring information of power consumptions for the respective functions of the image forming apparatus;

acquiring information of a supply power to be supplied to the image forming apparatus;

determining a power consumption value to be consumed by the image forming apparatus based on the acquired information of the power consumptions for the respective functions and the acquired information of the supply power acquired; and determining functions to be operated of the plurality of functions included in the image forming apparatus so as to be operated at the determined power consumption value;

setting the image forming apparatus to operate the determined functions;

determining based on the acquired information of the supply power and the acquired information of the power consumptions whether or not the supply power required to operate the functions of the image forming apparatus is insufficient;

determining, when the supply power required to operate the functions of the image forming apparatus is insufficient, whether or not a function of the image forming apparatus is allowed to be alternatively processed by an external apparatus; and instructing, when it is determined that the function is allowed to be alternatively processed by the external apparatus, the image forming apparatus to process a job by the external apparatus;

wherein the image forming apparatus switches the job to execution by the external apparatus upon reception of the instruction to process the job by the external apparatus.

13. A non-transitory computer-readable medium storing a program for controlling a computer to function as:

a power consumption acquisition unit configured to acquire information of power consumptions for respective functions of an image forming apparatus;

a supply power acquisition unit configured to acquire information of a supply power to be supplied to the image forming apparatus;

a power consumption determination unit configured to determine a power consumption value to be consumed by the image forming apparatus based on the information of the power consumptions for the respective functions acquired by said power consumption acquisition unit and the information of the supply power acquired by said supply power acquisition unit;

a a function determination unit configured to determine functions to be operated of the plurality of functions included in the image forming apparatus so as to be operated at the power consumption value determined by said power consumption determination unit;

a function setting unit configured to set the image forming apparatus to operate the functions determined by said function determination unit;

a power determination unit configured to determine based on the information of the supply power acquired by said supply power acquisition unit and the information of the power consumptions acquired by said power consumption acquisition unit whether or not the supply power required to operate the functions of the image forming apparatus is insufficient;

an external function processing determination unit configured to determine, when the supply power required to operate the functions of the image forming apparatus is insufficient, whether or not a function of the image forming apparatus is allowed to be alternatively processed by the external apparatus; and an instruction unit configured to instruct, when said external function processing determination unit determines that the function is allowed to be alternatively processed by the external apparatus, the image forming apparatus to process a job by the external apparatus;

wherein the image forming apparatus switches the job to execution by the external apparatus upon reception of the instruction to process the job by the external apparatus from said instruction unit.

* * * * *